US011634885B2

(12) United States Patent
Velde et al.

(10) Patent No.: US 11,634,885 B2
(45) Date of Patent: Apr. 25, 2023

(54) WORK VEHICLE MAGNETORHEOLOGICAL FLUID JOYSTICK SYSTEMS REDUCING UNINTENDED JOYSTICK MOTIONS

(71) Applicant: Deere & Company, Moline, IL (US)

(72) Inventors: Todd F. Velde, Dubuque, IA (US); Alex R. Vandegrift, Davenport, IA (US); Craig Christofferson, Dubuque, IA (US); Christopher J. Meyer, Dubuque, IA (US); Aaron R. Kenkel, East Dubuque, IL (US); Mark D. Anderson, Dubuque, IA (US); Lance R. Sherlock, Asbury, IA (US); Kenneth Franck, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 384 days.

(21) Appl. No.: 16/864,749

(22) Filed: May 1, 2020

(65) Prior Publication Data
US 2021/0341032 A1    Nov. 4, 2021

(51) Int. Cl.
*E02F 9/20* (2006.01)
*G05G 9/02* (2006.01)
(Continued)

(52) U.S. Cl.
CPC .......... *E02F 9/2004* (2013.01); *E02F 9/2029* (2013.01); *F16F 9/535* (2013.01);
(Continued)

(58) Field of Classification Search
CPC ............ G05G 1/04; G05G 5/005; G05G 5/02; G05G 5/03; G05G 5/05; G05G 5/12;
(Continued)

(56) References Cited

U.S. PATENT DOCUMENTS 7,197,873 B1    4/2007  Windhorst et al.
8,066,567 B2   11/2011  Waggoner et al.
(Continued)

FOREIGN PATENT DOCUMENTS

CA        1203605 A       4/1986
CN     102027268 B   *  12/2013    .......... F16C 11/0614
(Continued)

OTHER PUBLICATIONS

USPTO, Non-Final Office Action issued in Utility U.S. Appl. No. 16/916,800 dated Jun. 22, 2022.
(Continued)

*Primary Examiner* — Adam D Rogers
(74) *Attorney, Agent, or Firm* — Klintworth & Rozenblat IP LLP

(57) ABSTRACT

In embodiments, a work vehicle magnetorheological fluid (MRF) joystick system includes a joystick device, an MRF joystick resistance mechanism, and a controller architecture. The joystick device includes, in turn, a base housing, a joystick movably mounted to the base housing, and a joystick position sensor configured to monitor movement of the joystick relative to the base housing. The MRF joystick resistance mechanism is controllable to vary a first joystick stiffness resisting movement of the joystick relative to the base housing in at least one degree of freedom. The controller architecture is configured to: (i) detect when unintended joystick motion conditions occur during operation of the work vehicle; and (ii) when detecting unintended joystick motion conditions, command the MRF joystick resistance mechanism to increase the first joystick stiffness in a manner reducing susceptibility of the joystick device to unintended joystick motions.

18 Claims, 6 Drawing Sheets

(51) Int. Cl.
*F16F 9/53* (2006.01)
*G05G 5/00* (2006.01)
*G05G 9/047* (2006.01)
*G05G 5/03* (2008.04)

(52) U.S. Cl.
CPC .............. *G05G 5/005* (2013.01); *G05G 5/03* (2013.01); *G05G 9/047* (2013.01); *F16F 2224/045* (2013.01); *G05G 2009/04766* (2013.01)

(58) Field of Classification Search
CPC ......... G05G 9/047; G05G 2009/04707; G05G 2009/04751; G05G 2009/04766; E02F 9/2004; E02F 9/2029; F16F 9/535; F16F 2224/045
See application file for complete search history.

(56) References Cited

U.S. PATENT DOCUMENTS

| | | |
|---|---|---|
| 8,639,393 B2 | 1/2014 | Taylor et al. |
| 8,972,125 B1 | 3/2015 | Elliott |
| 9,141,126 B2 | 9/2015 | Hynes et al. |
| 9,181,676 B2 | 11/2015 | Meislahn et al. |
| 9,341,258 B1 | 5/2016 | Templin |
| 9,771,705 B2 | 9/2017 | Horstman et al. |
| 9,777,460 B2 | 10/2017 | Wuisan et al. |
| 9,777,461 B2 | 10/2017 | Wuisan et al. |
| 9,797,114 B2 | 10/2017 | Maifield et al. |
| 10,061,343 B2 | 8/2018 | Fredrickson et al. |
| 10,066,367 B1 | 9/2018 | Wang et al. |
| 10,119,244 B2 | 11/2018 | Elkins |
| 10,145,084 B2 | 12/2018 | Fredrickson |
| 11,048,330 B2 | 6/2021 | Eck et al. |
| 11,086,350 B2 | 8/2021 | Wakuda et al. |
| 11,300,990 B2 | 4/2022 | Battlogg |
| 2001/0052893 A1 | 12/2001 | Jolly et al. |
| 2003/0098196 A1 | 5/2003 | Yanaka |
| 2004/0204811 A1 | 10/2004 | Huang et al. |
| 2004/0221674 A1 | 11/2004 | Kornelson |
| 2006/0197741 A1 | 9/2006 | Biggadike |
| 2011/0005344 A1 | 1/2011 | Haevescher |
| 2013/0229272 A1 | 9/2013 | Elliott |
| 2016/0179128 A1 | 6/2016 | Guglielmo |
| 2017/0073935 A1 | 3/2017 | Friend et al. |
| 2018/0058039 A1 | 3/2018 | Fredrickson et al. |
| 2019/0071119 A1 | 3/2019 | Takenaka et al. |
| 2019/0210854 A1 | 7/2019 | Eck et al. |
| 2019/0286237 A1 | 9/2019 | Eck et al. |
| 2020/0041331 A1 | 2/2020 | Hoshino et al. |
| 2020/0125132 A1 | 4/2020 | Wakuda et al. |
| 2021/0286431 A1 | 9/2021 | Eck et al. |
| 2021/0340723 A1 | 11/2021 | Velde et al. |
| 2021/0340724 A1 | 11/2021 | Kenkel et al. |
| 2021/0340725 A1 | 11/2021 | Velde et al. |
| 2021/0340726 A1 | 11/2021 | Vandegrift et al. |
| 2021/0340728 A1 | 11/2021 | Graham et al. |
| 2021/0341032 A1 | 11/2021 | Velde et al. |
| 2021/0341033 A1 | 11/2021 | Breutzman et al. |
| 2021/0341960 A1 | 11/2021 | Kenkel et al. |

FOREIGN PATENT DOCUMENTS

| | | |
|---|---|---|
| CN | 112267516 A | 1/2021 |
| DE | 19848191 A1 | 4/2000 |
| DE | 102004017148 A1 | 1/2005 |
| DE | 102004041690 A1 | 3/2005 |
| DE | 112009003181 T5 | 1/2012 |
| DE | 102012203095 A1 | 9/2013 |
| DE | 112013001281 T5 | 12/2014 |
| DE | 102020104810 A1 | 2/2021 |
| JP | 2014174726 A | 9/2014 |
| KR | 20190074555 A | 6/2019 |
| WO | 9642078 A1 | 12/1996 |
| WO | 2015009161 A1 | 1/2015 |

OTHER PUBLICATIONS

German Search Report issued in application No. DE102021203189.7 dated Dec. 1, 2021 (04 pages).
German Search Report issued in application No. DE102021203343.1 dated Dec. 2, 2021 (05 pages).
German Search Report issued in application No. DE102021203250.8 dated Dec. 2, 2021 (04 pages).
German Search Report issued in application No. DE102021202960.4 dated Dec. 1, 2021 (04 pages).
German Search Report issued in application No. DE102021203367.9 dated Dec. 1, 2021 (05 pages).
USPTO, Non-Final Office Action issued in Utility U.S. Appl. No. 17/002,052 dated Nov. 8, 2021.
German Search Report issued in application No. DE102021203807.7 dated Jan. 26, 2022 with English translation (11 pages).
German Search Report issued in application No. DE102021203860.3 dated Jan. 28, 2022 with English translation (11 pages).
Farzad Ahmadkhanlou, Design, Modeling and Control of Magnetorheological Fluid-Based Force Feedback Dampers for Telerobotic Systems, ResearchGate, https://www.researchgate.net/publication/251697638, Apr. 2008. (19 pages).
Deere & Company, John Deere Motor Grader Left Dual Joystick Controls Tutorial, https://www.youtube.com/watch?v=iYxPlxzD8g4&feature=youtu.be&t=25, Mar. 7, 2017. (2 pages).
MRF Damper, FMR-70S-403 Brochure, undated admitted prior art. (3 pages).
Deere & Company, pending U.S. Appl. No. 63/019,083, filed May 1, 2020.
Deere & Company, pending Utility U.S. Appl. No. 16/864,696, filed May 1, 2020.
Deere & Company, pending Utility U.S. Appl. No. 16/864,726, filed May 1, 2020.
Deere & Company, pending Utility U.S. Appl. No. 16/916,800, filed Jun. 30, 2020.
Deere & Company, pending Utility U.S. Appl. No. 16/922,321, filed Jul. 7, 2020.
Deere & Company, pending Utility U.S. Appl. No. 16/989,427, filed Aug. 10, 2020.
Deere & Company, pending Utility U.S. Appl. No. 17/002,052, filed Aug. 25, 2020.
Deere & Company, pending Utility U.S. Appl. No. 17/038,399, filed Sep. 30, 2020.
Non-Final Office Action issued in Utility U.S. Appl. No. 16/864,696 dated Sep. 16, 2021.

* cited by examiner

WORK VEHICLE MAGNETORHEOLOGICAL FLUID JOYSTICK SYSTEMS REDUCING UNINTENDED JOYSTICK MOTIONS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle magnetorheological fluid (MRF) joystick systems, which utilize MRF joystick resistance mechanisms to selectively increase joystick resistance in a manner reducing unintended joystick motions.

BACKGROUND OF THE DISCLOSURE

Joystick devices are commonly utilized to control various operational aspects of work vehicles employed within the construction, agriculture, forestry, and mining industries. For example, in the case of a work vehicle equipped with a boom assembly, an operator may utilize one or more joystick devices to control boom assembly movement and, therefore, movement of a tool or implement mounted to an outer terminal end of the boom assembly. Common examples of work vehicles having such joystick-controlled boom assemblies include excavators, feller bunchers, skidders, tractors (on which modular front end loader and backhoe attachments may be installed), tractor loaders, wheel loaders, and various compact loaders. Similarly, in the case of dozers, motor graders, and other work vehicles equipped with earth-moving blades, an operator may utilize with one or more joysticks to control blade movement and positioning. Joystick devices are also commonly utilized to steer or otherwise control the directional movement of the work vehicle chassis in the case of motor graders, dozers, and certain loaders, such as skid steer loaders. Given the prevalence of joystick devices within work vehicles, taken in combination with the relatively challenging, dynamic environments in which work vehicles often operate, a continued demand exists for advancements in the design and function of work vehicle joystick systems, particularly to the extent that such advancements can improve the safety and efficiency of work vehicle operation.

SUMMARY OF THE DISCLOSURE

A work vehicle magnetorheological fluid (MRF) joystick system is disclosed for usage onboard a work vehicle. In embodiments, the work vehicle MRF joystick system includes a joystick device, an MRF joystick resistance mechanism, and a controller architecture. The joystick device includes, in turn, a base housing, a joystick movably mounted to the base housing, and a joystick position sensor configured to monitor movement of the joystick relative to the base housing. The MRF joystick resistance mechanism is controllable to vary a first joystick stiffness resisting movement of the joystick relative to the base housing in at least one degree of freedom. Coupled to the joystick position sensor and to the MRF joystick resistance mechanism, the controller architecture is configured to: (i) detect when unintended joystick motion conditions occur during operation of the work vehicle; and (ii) when detecting unintended joystick motion conditions, command the MRF joystick resistance mechanism to increase the first joystick stiffness in a manner reducing susceptibility of the joystick device to unintended joystick motions.

In further embodiments, the work vehicle MRF joystick system includes a joystick device, an MRF joystick resistance mechanism, and a controller architecture. The joystick device contains a base housing, a joystick movably mounted to the base housing, and a joystick position sensor configured to monitor movement of the joystick relative to the base housing. The controller architecture is coupled to the joystick position sensor and to the MRF joystick resistance mechanism, which is controllable to vary a joystick stiffness resisting movement of the joystick relative to the base housing in at least one degree of freedom. The controller architecture is configured to: (i) determine when unintended joystick motions of the joystick are presently occurring based, at least in part, on data provided by the joystick position sensor; and (ii) when determining that unintended joystick motions are presently occurring, command the MRF joystick resistance mechanism to increase the joystick stiffness in a manner reducing the unintended joystick motions.

In still further embodiments, the work vehicle MRF joystick system includes a joystick device, an MRF joystick resistance mechanism, a controller architecture, and disturbance force sensors configured to detect disturbance forces imparted to the work vehicle. The joystick device contains a base housing, a joystick movably mounted to the base housing, and a joystick position sensor configured to monitor movement of the joystick relative to the base housing. The MRF joystick resistance mechanism is controllable to vary a joystick stiffness of the joystick device, which resists movement of the joystick relative to the base housing in at least one degree of freedom. The controller architecture is coupled to the joystick position sensor, to the MRF joystick resistance mechanism, and to the disturbance force sensors. The controller architecture is configured to: (i) monitor for disturbance forces detected by disturbance force sensors during operation of the work vehicle; and (ii) when the disturbance force sensors detect a disturbance force surpassing a predetermined threshold, command the MRF joystick resistance mechanism to increase the joystick stiffness to reduce a likelihood of unintended joystick motions resulting from the detected disturbance force.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
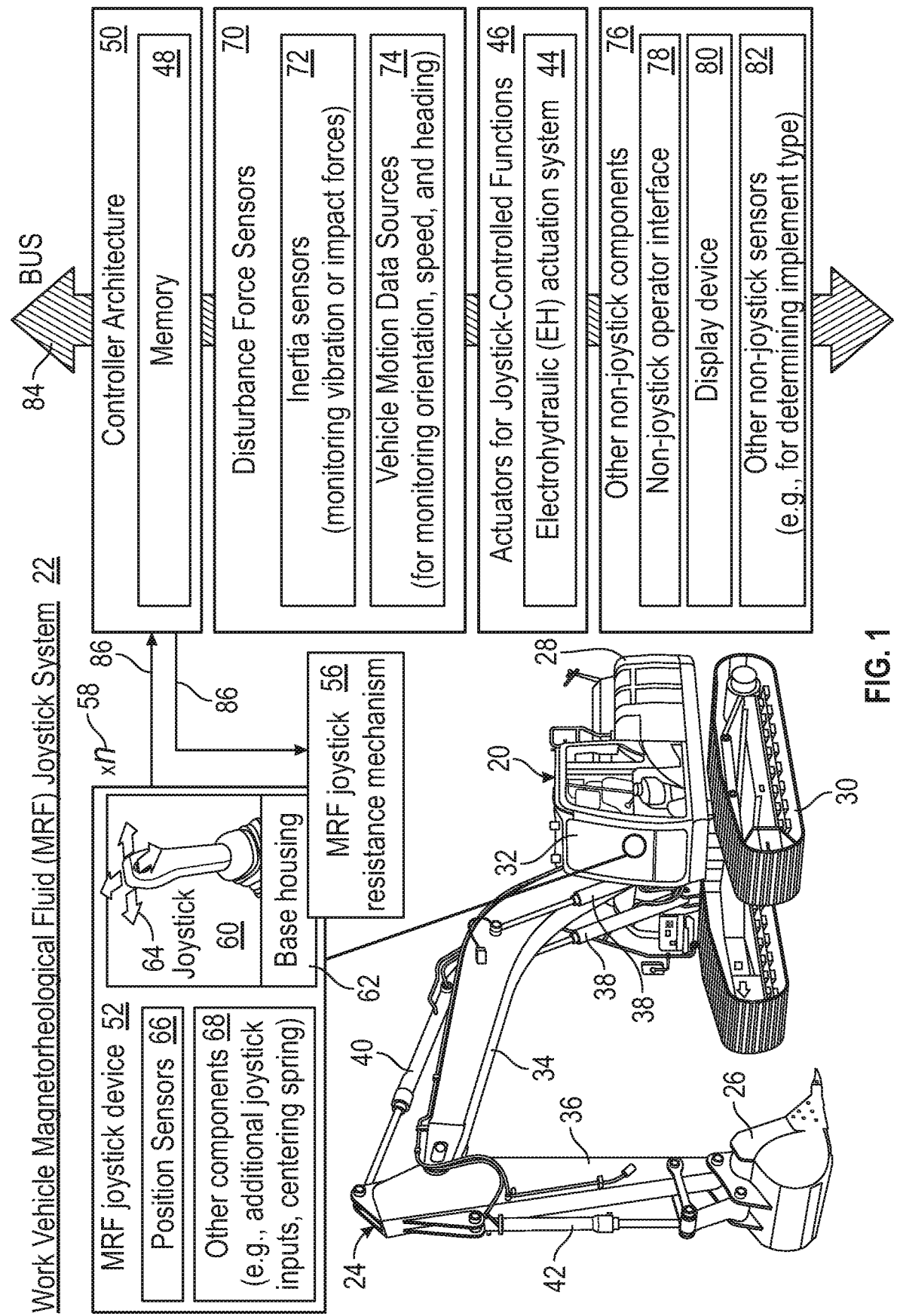
FIG. 1 is a schematic of an example magnetorheological fluid (MRF) joystick system onboard a work vehicle (here, an excavator) and configured to reduce or impede unintended joystick motions through selectively-applied increases in joystick stiffness, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as setforth the appended claims. As appearing herein, the term "work vehicle" includes all parts of a work vehicle or work machine. Thus, in implementations in which a boom assembly terminating in an implement is attached to the chassis of a work vehicle, the term "work vehicle" encompasses both the chassis and the boom assembly, as well as the implement or tool mounted to the terminal end of the boom assembly.

Overview

As previously indicated, joystick devices are commonly integrated into work vehicles to provide intuitive, versatile operator interfaces for controlling various work vehicle functionalities. Joystick devices are, however, susceptible to unintended joystick movements in the presence of high intensity disturbance forces, which are imparted to the work vehicle, propagate to the operator station, and ultimately to the joystick device or devices located therein. Such disturbance forces may assume the form of, for example, sustained, high intensity (high amplitude or frequency) vibrational forces or more transitory, high amplitude impact forces. With respect to high intensity vibrational forces, in particular, such vibrations may be generated during work vehicle operation for various reasons. High intensity vibrations may occur during work vehicle travel over highly uneven surfaces and hardened materials, depending upon the suspension characteristics of the work vehicle, the undercarriage of the work vehicle (whether wheeled, rubber tracked, or metal tracked), and similar factors. High intensity vibrational forces are also commonly generated during usage of certain tools or implements attached to work vehicles, such as a hydraulic hammer mounted to an excavator (or other work vehicle) via a boom assembly. A certain level of baseline vibrations may also be generated due to imbalances of the rotating components contained within a given work vehicle, which may develop and worsen over time. Such baseline vibrations can constructively interfere with other vibrational sources occurring during work vehicle operation to yield high intensity vibrations capable of inducing unintended motions (e.g., inadvertent or involuntary motions) of one or more joysticks located within the operator station of a work vehicle. For example, an operator grasping a joystick may inadvertently impart repeating, oscillating motions to the joystick (herein, "operator-induced oscillation" or "OIO" of the joystick) as the operator attempts to control a joystick-commanded function of a work vehicle when operating in such a high vibratory environment.

More transitory, high magnitude disturbance forces may also occur during work vehicle operation due to, for example, impact forces imparted to certain regions of a work vehicle. Such impact forces may occur when a portion of a work vehicle, such as a bucket, claw, or other implement attached to a boom assembly, is repeatedly struck against a hard, motion-resistant surface during performance of a particular work task. Such impact forces may generate shock forces, which travel or propagate through the structure of the work vehicle, to the operator, and to the joystick device or devices located within the operator station of the work vehicle. If sufficiently severe, such propagating disturbance forces can result in unintended movement of the joystick or joysticks within the operator station of the work vehicle. So too may significant transitory disturbance forces occur due to abrupt changes in the speed, heading, or orientation of a work vehicle, which result in disparities between the inertial vector of an operator's body relative to that of the work vehicle. This may result in displacement of an operator's body relative to a joystick device, thus increasing the likelihood that the operator may inadvertently move the joystick of the joystick device in an unintended manner.

In certain instances, disturbance forces occurring during work vehicle operation can also result in unintended motions of a joystick even when the joystick is not currently grasped or otherwise contacted by an operator. Unintended joystick motions of this type may arise when disturbance forces displace or dislodge a joystick from a particular position in which the joystick is intended to remain, with the joystick movement occurring without contact (or with minimal contact) by the work vehicle operator. As a specific example, in the case of a friction-hold joystick intended to remain in any operator-selected position absent an operator-applied force, unintended joystick motions may occur as vibrational forces or other disturbance forces cause the joystick to gradually move or rift from the operator-selected position absent an operator-applied force. Similarly, in the case of a self-centering joystick device having detent features, unintended joystick motion may occur should disturbance forces displace a joystick from an operator-selected detent position without (or with minimal) operator contact.

At least some of the above-described issues can addressed, within limits, by imparting a joystick device with a relatively high stiffness; that is, a relatively high resistive force impeding rotation or other movement of the joystick relative to its base housing. Similarly, in the case of a self-centering joystick including detent features, the joystick device can be designed to apply a greater force maintaining the joystick in operator-selected detent position (herein, the "detent hold force") when the joystick is moved into a given detent position by an operator. Such solutions are less than ideal, however, and may render the joystick undesirably difficult to move during normal usage. As another, more general solution, an operator can potentially minimize unintended joystick motions by physically countering disturbance forces resulting in unintended joystick motions; e.g., by attempting to brace for impact forces or by loosening the operator's grip on a joystick when operating in a high vibratory environment. While straightforward, such solutions are again impractical and largely ineffective. Requiring work vehicle operators to manually compensate for unintended joystick motions is mentally and physically fatiguing to operators, particularly as operators often pilot work vehicles for extended periods of time in harsh operational environments. Further, in actual practice, it is highly difficult, if not impossible for a human operator to compensate for unintended joystick motions resulting from disturbance forces on a reliable, repeated basis. Finally, as another potential solution in the context of electronic joystick devices, control logic can be introduced to decrease joystick sensitivity and/or to attempt identify and disregard unintentional input motions imparted to a joystick device. Such solutions are again suboptimal, however, and associated with various drawbacks, including the introduction of undesired complexity into the control logic and an increased risk of dismissing precise, purposeful joystick motions as unintentional or accidental. Further, such control logic schemes do little to reduce the physical strain placed on work vehicle operators when attempting to physically compensate for unintended joystick motions in the presence of disturbance forces generated during work vehicle operation.

An ongoing industrial demand thus persists for work vehicle joystick systems capable of mitigating unintended joystick motions otherwise occurring due to disturbance forces encountered during work vehicle operation. In satisfaction of this demand, the following describes unique work vehicle joystick systems incorporating magnetorheological fluid (MRF) control subsystems or devices, which reduce unintended joystick motions through strategic, selectively-applied increases in joystick stiffness. Embodiments of the work vehicle MRF joystick system include a processing sub-system or "controller architecture," which is coupled to an MRF joystick resistance mechanism; that is, a mechanism or device containing a magnetorheological fluid and capable of modifying the rheology (viscosity) of the fluid through variations in the strength of an electromagnetic (EM) field in a manner affecting joystick stiffness. During operation of the work vehicle MRF joystick system, the controller architecture continually monitors for unintended joystick motion conditions; that is, conditions marked by a presently-detected, ongoing occurrence of unintended joystick motions or, alternatively, conditions under which unintended joystick motions are undesirably likely to occur in a near-term timeframe. When detecting such unintended joystick motion conditions, the controller architecture commands the MRF joystick resistance mechanism to apply a controlled increase in one or more stiffnesses of the joystick device to reduce susceptibility of the joystick device to unintended joystick motions.

Embodiments of the MRF joystick device may selectively increase joystick stiffness in accordance with a reactive control scheme, a proactive control scheme, or a combination of these control schemes. As utilized in this context, the term "reactive" control scheme refers to a control scheme by which controlled increases in joystick stiffness are applied in response to unintended joystick motions that are currently detected by one or more sensors and ongoing. Comparatively, the term "proactive" control scheme refers to a control scheme by which the controlled increases in joystick stiffness are applied in response an undesirably high predicted likelihood of unintended joystick motions occurring imminently or otherwise in a near-term timeframe. Accordingly, when employing a proactive control scheme in one example, the MRF joystick system may rapidly increase joystick stiffness in response to detection of a disturbance force at a location remote from the MRF joystick device, with the resulting disturbance force wave then propagating to the joystick device. Such disturbance forces may be detected utilizing various disturbance force sensors onboard the work vehicle; the term "disturbance force sensor," as appearing throughout this document, encompassing any sensor providing data indicative of a vibratory force, an impact force, or an abrupt inertial change or other such disturbance force imparted to the work vehicle and potentially sufficient to induce unintended joystick motions. Such disturbance force sensors may assume the form of, for example, microelectromechanical systems (MEMS) gyroscopes, accelerometers, and perhaps magnetometers potentially packaged as one or more inertial measurement units (IMUs) integrated to the work vehicle at various locations; e.g., such IMUs may be affixed to the chassis of a work vehicle, and, if the work vehicle is equipped with a boom assembly, integrated into the boom assembly at various locations.

When selectively increasing joystick stiffness in accordance with a reactive control scheme, the controller architecture may monitor for repeated, unintended joystick motions utilizing one or more joystick position sensors integrated into an MRF joystick device. Consider, for example, embodiments in which the controller architecture selectively increases joystick stiffness to suppress detected OIO displacements of a joystick included in a given joystick device. When sensing joystick motions, the controller architecture may initially determine whether currently-sensed joystick motions are, in fact, a result of OIO displacements of the joystick. The controller architecture may perform this analysis by considering the magnitude and repeating nature of the joystick motions; and, perhaps, by comparing the pattern of joystick movements to a pre-established OIO displacement pattern stored in memory. In certain embodiments, the controller architecture may also consider whether any disturbance force sensors onboard the work vehicle presently report vibratory forces corresponding to the currently-detected joystick displacements. When identifying such unintended joystick motions, the controller architecture may command the MRF joystick resistance mechanism to increase joystick stiffness by a controlled amount to suppress (reduce or eliminate) the OIO joystick motions. The controller architecture may then continue to monitor whether the MRF-applied stiffness increase brought about a desired suppression of the OIO motions of the joystick. If the OIO joystick motions have not been adequately suppressed, the controller architecture may continue to progressively increase the joystick stiffness, in a continual or stepwise manner, until the OIO joystick motions fully cease, until the OIO joystick motions are reduced to an acceptable level (as may be determined by an operator-adjustable tolerance setting), or until an upper joystick stiffness threshold is reached.

When modifying joystick stiffness in accordance with a proactive control scheme, the MRF joystick system may selectively increase joystick stiffness in response to one or more conditions creating an undesirably high probability of unintended joystick motions. Such a proactive stiffness control scheme can be performed on a highly abbreviated timescale (e.g., on the order of milliseconds) when, for example, an impact or shock force is detected at one region of the work vehicle, such as at the terminal end of a boom assembly attached to a work vehicle. In this case, the MRF joystick stick system rapidly responds or reacts to the detection of such a shock force by increasing the MRF joystick stiffness prior to (or at least substantially concurrently with) transmission of the shock force to the operator station of the work vehicle and, therefore, the operator and joystick device(s) located therein. Similarly, if detecting a disturbance force sufficient to induce an aggressive, abrupt displacement of the operator's body (e.g., due to a pronounced change in the speed, heading, or orientation of the work vehicle), the controller architecture may command the MRF joystick resistance mechanism to rapidly boost joystick stiffness in a manner safeguarding against joystick motions unintentionally imparted to a joystick as the operator is jostled or otherwise displaced relative to joystick device(s) at issue. In still other instances, the controller architecture may apply such a proactive stiffness control scheme on a less abbreviated, but still near-term timescale; e.g., when the likelihood of unintended joystick motions becomes undesirably high due to a temporary operative state or condition of the work vehicle. Examples of such operative states that may trigger a joystick stiffness increase, as applied to reduce the likelihood of unintended joystick motions, include travel of a work vehicle at higher speeds, travel of a work vehicle over vibration-inducing terrain, or attachment of an implement or tool to a work vehicle (e.g., a hydraulic hammer) known to generate disturbance forces during usage.

In embodiments in which a joystick is movable relative to a base housing in multiple degrees of freedom (DOFs), embodiments of the MRF joystick control system may be capable of increasing joystick stiffness in a single DOF or, instead, of independently increasing joystick stiffness in multiple DOFs. For example, in implementations which a joystick is rotatable about two perpendicular axes, the MRF resistance mechanism may be capable of independently increasing the joystick stiffnesses (that is, the forces inhibiting rotation of the joystick) about the two rotational axes of the joystick. Accordingly, in such instances, the controller architecture may command the MRF joystick control system to independently vary first and second joystick stiffnesses resisting rotation of the joystick about first and second axes, respectively, as best suited to suppress unintended joystick motions as they occur (given the directionality of such unintended joystick motions) or as best suited to reduce the likelihood of future unintended joystick motions (given the characteristics of the detected conditions motivating the joystick stiffness increase, such as the directionality of impact forces imparted to the work vehicle and propagating toward the joystick device or devices).

In embodiments, such an approach of selectively boosting joystick stiffness to mitigate unintended joystick motions can be applied uniformly across the range of motion (ROM) of a joystick in one or more DOFs; e.g., for a joystick rotatable about two perpendicular axes, an increase in joystick stiffness may be applied to resist joystick rotation uniformly about either axis or both axes across the ROM of the joystick. In other instances, the controller architecture may apply an increased joystick stiffness to reduce the likelihood of unintended joystick motions such that the increased MRF stiffness force resisting joystick motion is dependent upon joystick position. For example, in this latter approach, the controller architecture may cause the MRF-applied stiffness force to increase or decrease as a joystick is displaced further from a neutral, home, or centered position. Similarly, such an approach may also be employed for increasing the MRF-applied stiffness resisting dislodgement of a joystick from certain discrete detent positions encountered when moving the joystick through its ROM. In this case, the controller architecture may command the MRF resistance mechanism to temporarily increase the detent hold force retaining the joystick in a given detent position in response to any or all of the proactive triggers mentioned above; e.g., detection of impact or shock force propagating toward the work vehicle operator station or usage of an implement associated with shock force-generation. Similarly, the controller architecture may command the MRF resistance mechanism to increase the detent hold force in response to the detection of regular vibratory forces or jitter; e.g., in a high vibration environment, the controller architecture may progressively increase the detent hold force, in a stepped or continual manner, in proportion to the intensity of vibrational forces measured by the disturbance force sensors onboard the work vehicle.

In the above-described manner, embodiments of the MRF joystick system generate selective, MRF-applied increases in joystick stiffness to reduce, if not eliminate unintended joystick motions that may otherwise occur during work vehicle operation. In so doing, embodiments of the MRF joystick system minimize operator fatigue and enhance operator experience by reducing the frequency and severity of unintended joystick motions. Concurrently, such reductions in unintended joystick motions may minimize component wear, boost work vehicle efficiency, and otherwise promote precise, consistent control of work vehicle functions in response to operator-controlled joystick commands. Additionally, the usage of MRF technology to selectively increase joystick stiffness provides various benefits over other mechanisms (e.g., actuated friction mechanisms) capable of providing controlled increases in joystick stiffnesses. As one such benefit, magnetorheological fluids are rapidly responsive to changes in the strength of an EM field in which the magnetorheological fluids may be immersed. As the strength of an EM field can likewise be varied in a rapid manner, highly responsive MRF joystick resistance mechanisms can be designed to provide response times in varying joystick stiffness on the order of, for example, a few milliseconds. The highly responsive nature of the MRF joystick resistance mechanism enables the joystick stiffness to be rapidly increased in response to detection of disturbance forces, such as impact forces, in the manner briefly discussed above and described more fully below. Further, embodiments of the MRF joystick resistance mechanism can generate MRF stiffness forces over a continuous range, thereby allowing the MRF joystick device to progressively increase the joystick stiffness (in a stepped or continuous manner) in certain instances; e.g., to gradually drive sensed OIO joystick motions to null or in response to increasing vibrational intensity within a high vibratory environment.

An example embodiment of a work vehicle MRF joystick system will now be described in conjunction with FIGS. 1-5. In the below-described example embodiment, the MRF joystick system is principally discussed in the context of a particular type of work vehicle, namely, an excavator. Additionally, in the following example, the MRF joystick system includes two joystick devices, which each have a joystick rotatable about two perpendicular axes and which are utilized to control movement of the excavator boom assembly and the implement (e.g., bucket, grapple, or hydraulic hammer) attached thereto. The following example notwithstanding, the MRF joystick system may include a greater or lesser number of joysticks in further embodiments, with each joystick device movable in any number of DOFs and along any suitable motion pattern; e.g., in alternative implementations, a given joystick device may be rotatable about a single axis or, perhaps, movable along a limited (e.g., H-shaped) track or motion pattern. Moreover, the below-described MRF joystick system can be deployed on wide range of work vehicles including joystick-controlled functions, additional examples of which are discussed below in connection with FIG. 6.

Example MRF Joystick System for Reducing Unintended Joystick Motions

Referring initially to FIG. 1, an example work vehicle (here, an excavator 20) equipped with a work vehicle MRF joystick system 22 is presented. In addition to the MRF joystick system 22, the excavator 20 includes a boom assembly 24 terminating in a tool or implement, such a bucket 26. Various other implements can be interchanged with the bucket 26 and attached to the terminal end of the boom assembly 24 including, for example, other buckets, grapples, and hydraulic hammers. The excavator 20 features a body or chassis 28, a tracked undercarriage 30 supporting the chassis 28, and a cabin 32 located at forward portion of the chassis 28 and enclosing an operator station. The excavator boom assembly 24 extends from the chassis 28 and contains, as principal structural components, an inner or proximal boom 34 (hereafter, "the hoist boom 34"), an outer or distal boom 36 (hereafter, "the dipperstick 36"), and a number of hydraulic cylinders 38, 40, 42. The hydraulic cylinders 38, 40, 42 include, in turn, two hoist cylinders 38, a dipperstick cylinder 40, and a bucket cylinder 42. Extension and retraction of the hoist cylinders 38 rotates the hoist boom 34 about a first pivot joint at which the hoist boom 34 is joined to the excavator chassis 28, here at location adjacent (to the right of) the cabin 32. Extension and retraction of the dipperstick cylinder 40 rotates the dipperstick 36 about a second pivot joint at which the dipperstick 36 is joined to the hoist boom 34. Finally, extension and retraction of the bucket cylinder 42 rotates or "curls" the excavator bucket 26 about a third pivot joint at which the bucket 26 is joined to the dipperstick 36.

The hydraulic cylinders 38, 40, 42 are included in an electrohydraulic (EH) actuation system 44, which is encompassed by a box 46 entitled "actuators for joystick-controlled functions" in FIG. 1. Movements of the excavator boom assembly 24 are controlled utilizing at least one joystick located within the excavator cabin 32 and included in the MRF joystick system 22. Specifically, an operator may utilize the joystick or joysticks included in the MRF joystick system 22 to control the extension and retraction of the hydraulic cylinders 38, 40, 42, as well as to control the swing action of the boom assembly 24 via rotation of the excavator chassis 28 relative to the tracked undercarriage 30. The depicted EH actuation system 44 also contains various other non-illustrated hydraulic components, which may include flow lines (e.g., flexible hoses), check or relief valves, pumps, a, fittings, filters, and the like. Additionally, the EH actuation system 44 contains electronic valve actuators and flow control valves, such as spool-type multi-way valves, which can be modulated to regulate the flow of pressurized hydraulic fluid to and from the hydraulic cylinders 38, 40, 42. This stated, the particular construction or architecture of the EH actuation system 44 is largely inconsequential to embodiments of the present disclosure, providing that the below-described controller architecture 50 is capable of controlling movement of the boom assembly 24 via commands transmitted to selected ones of the actuators 46 effectuating the joystick controlled functions of the excavator 20.

As schematically illustrated in an upper left portion of FIG. 1, the work vehicle MRF joystick system 22 contains one or more MRF joystick devices 52, 54. As appearing herein, the term "MRF joystick device" refers to an operator input device including at least one joystick or control lever, the movement of which can be impeded by a variable resistance force or "stiffness force" applied utilizing an MRF joystick resistance mechanism of the type described herein. While one such MRF joystick device 52 is schematically shown in FIG. 1 for clarity, the MRF joystick system 22 can include any practical number of joystick devices, as indicated by symbol 58. In the case of the example excavator 20, the MRF joystick system 22 will typically include two joystick devices; e.g., joystick devices 52, 54 described below in connection with FIG. 2. The manner in which two such joystick devices 52, 54 may be utilized to control movement of the excavator boom assembly 24 is further discussed below. First, however, a general discussion of the joystick device 52, as schematically illustrated in FIG. 1, is provided to establish a general framework in which embodiments of the present disclosure may be better understood.

As schematically illustrated in FIG. 1, the MRF joystick device 52 includes a joystick 60 mounted to a lower support structure or base housing 62. The joystick 60 is movable relative to the base housing 62 in at least one DOF and may be rotatable relative to the base housing 62 about one or more axes. In the depicted embodiment, and as indicated by arrows 64, the joystick 60 of the MRF joystick device 52 is rotatable relative to the base housing 62 about two perpendicular axes and will be described below as such. The MRF joystick device 52 includes one or more joystick position sensors 66 for monitoring the current position and movement of the joystick 60 relative to the base housing 62. Various other components 68 may also be included in the MRF joystick device 52 including buttons, dials, switches, or other manual input features, which may be located on the joystick 60 itself, located on the base housing 62, or a combination thereof. Spring elements (gas or mechanical), magnets, or fluid dampers may be incorporated into the joystick device 52 to provide a desired rate of return to a home position of the joystick, as well as to fine-tune the desired feel of the joystick 60 perceived by an operator when interacting with the MRF joystick device 52. In more complex components, various other components (e.g., potentially including one or more artificial force feedback (AFF) motors) can also be incorporated into the MRF joystick device 52. In other implementations, such components may be omitted from the MRF joystick device 52.

An MRF joystick resistance mechanism 56 is at least partially integrated into the base housing 62 of the MRF joystick device 52. The MRF joystick resistance mechanism 56 can be controlled to adjust the MRF resistance force and, therefore, joystick stiffness resisting joystick motion relative to the base housing 62 in at least one DOF. During operation of the MRF joystick system 22, the controller architecture 50 may selectively command the MRF joystick resistance mechanism 56 to increase the joystick stiffness impeding joystick rotation about a particular axis or combination of axes. As discussed more fully below, the controller architecture 50 may command the MRF joystick resistance mechanism 56 to increase joystick stiffness, when appropriate to reduce unintended joystick motions (actual or anticipated), by increasing the strength of an EM field in which a magnetorheological fluid contained in the mechanism 56 is at least partially immersed. A generalized example of one manner in which the MRF joystick resistance mechanism 56 may be realized is described below in connection with FIGS. 3 and 4.

In determining whether an MRF-applied increase in joystick stiffness is warranted to reduce unintended joystick motions, whether actual or anticipated, the controller architecture 50 can consider data input from any number and type of data sources. Such data sources can include disturbance force sensors 70 onboard the excavator 20. The disturbance force sensors 70 can include any number and type of sensors for measuring vibrational forces, impact forces, abrupt inertial changes of the excavator 20, or other such disturbance forces imparted to the work vehicle. Often, the disturbance force sensors 70 will include a plurality of inertia sensors 72, such as MEMS gyroscopes, accelerometers, and possibly magnetometers packaged as IMUs, which are affixed to the excavator 20 at various locations. For example, IMUs can be affixed to the excavator chassis 28 and one or more locations (different linkages) of the excavator boom assembly 24.

In embodiments, the disturbance force sensors 70 further include a number of vehicle motion data sources 74. The vehicle motion data sources 74 can include any sensors or data sources providing information pertaining to changes in the position, speed, heading, or orientation of the excavator 20. Again, MEMS gyroscopes, accelerometers, and possibly magnetometers packaged IMUs can be utilized to detect and measure such changes. Inclinometers or similar sensors may be employed to monitor the orientation of the excavator chassis 28 or portions of the boom assembly 24 relative to gravity in embodiments. The vehicle motion data sources 74 may further include Global Navigation Satellite System (GNSS) modules, such as Global Positioning System (GPS) modules, for monitoring excavator position and motion states. In embodiments, the vehicle motion data sources 74 may also include sensors from which the rotational rate of the undercarriage tracks may be calculated, electronic compasses for monitoring heading, and other such sensors. In certain cases, GPS or other GNSS data may also be utilized, possibly along with map data stored in the memory 48, to determine when the excavator 20 (or other work vehicle) operates within an environment in which significant disturbance forces are likely to be encountered. Finally, the vehicle motion data sources 74 can include various sensors for monitoring the motion and position of the boom assembly 24 and the bucket 26, including MEMS devices integrated into the boom assembly 24 (as previously noted), transducers for measuring angular displacements at the pin joints of the boom assembly, transducers for measuring the stroke of the hydraulic cylinders 38, 40, 42, and the like.

Embodiments of the MRF joystick system 22 may further include any number of other non-joystick components 76 in addition to those previously described. Such additional non-joystick components 76 may include an operator interface 78 (distinct from the MRF joystick device 52), a display device 80 located in the excavator cabin 32, and various other types of non-joystick sensors 82. The operator interface 78, in particular, can include any number and type of non joystick input devices for receiving operator input, such as buttons, switches, knobs, and similar manual inputs external to the MRF joystick device 52. Such input devices included in the operator input interface 78 can also include cursor-type input devices, such as a trackball or joystick, for interacting with a graphical user interface (GUI) generated on the display device 80. The display device 80 may be located within the cabin 32 and may assume the form of any image-generating device on which visual alerts and other information may be visually presented. The display device 80 may also generate a GUI for receiving operator input or may include other inputs (e.g., buttons or switches) for receiving operator input, which may be pertinent to the controller architecture 50 when performing the below-described processes. In certain instances, the display device 80 may also have touch input capabilities.

Finally, the MRF joystick system 22 can include various other non-joystick sensors 82, which provide the controller architecture 50 with data inputs utilized in carrying-out the below-described processes. For example, the non-joystick sensors 82 can include sensors for automatically determining the type of implement currently attached to the excavator 20 (or other work vehicle) in at least some implementations when this information is considered by the controller architecture 50 in determining when to increase joystick stiffness to reduce unintended joystick motions; e.g., such sensors 82 may determine a particular implement type currently attached to the excavator 20 by sensing a tag (e.g., a radio frequency identification tag) or reading other identifying information present on the implement, by visual analysis of a camera feed capturing the implement, or utilizing any other technique. In other instances, an operator may simply enter information selecting the implement type currently attached to the boom assembly 24 by, for example, interacting with a GUI generated on the display device 80. In still other instances, such other non-joystick sensors 82 may include sensors or cameras capable of determining when an operator grasps or other contacts the joystick 60. In other embodiments, such sensors may not be contained in the MRF joystick system 22.

As further schematically depicted in FIG. 1, the controller architecture 50 is associated with a memory 48 and may communicate with the various illustrated components over any number of wired data connections, wireless data connections, or any combination thereof; e.g., as generically illustrated, the controller architecture 50 may receive data from various components over a centralized vehicle or a controller area network (CAN) bus 84. The term "controller architecture," as appearing herein, is utilized in a non-limiting sense to generally refer to the processing subsystem of a work vehicle MRF joystick system, such as the example MRF joystick system 22. Accordingly, the controller architecture 50 can encompass or may be associated with any practical number of processors, individual controllers, computer-readable memories, power supplies, storage devices, interface cards, and other standardized components. In many instances, the controller architecture 50 may include a local controller directly associated with the joystick interface and other controllers located within the operator station enclosed by the cabin 32, with the local controller communicating with other controllers onboard the excavator 20 as needed. The controller architecture 50 may also include or cooperate with any number of firmware and software programs or computer-readable instructions designed to carry-out the various process tasks, calculations, and control functions described herein. Such computer-readable instructions may be stored within a non-volatile sector of the memory 48 associated with (accessible to) the controller architecture 50. While generically illustrated in FIG. 1 as a single block, the memory 48 can encompass any number and type of storage media suitable for storing computer-readable code or instructions, as well as other data utilized to support the operation of the MRF joystick system 22. The memory 48 may be integrated into the controller architecture 50 in embodiments as, for example, a system-in-package, a system-on-a-chip, or another type of microelectronic package or module.

Figure 2:
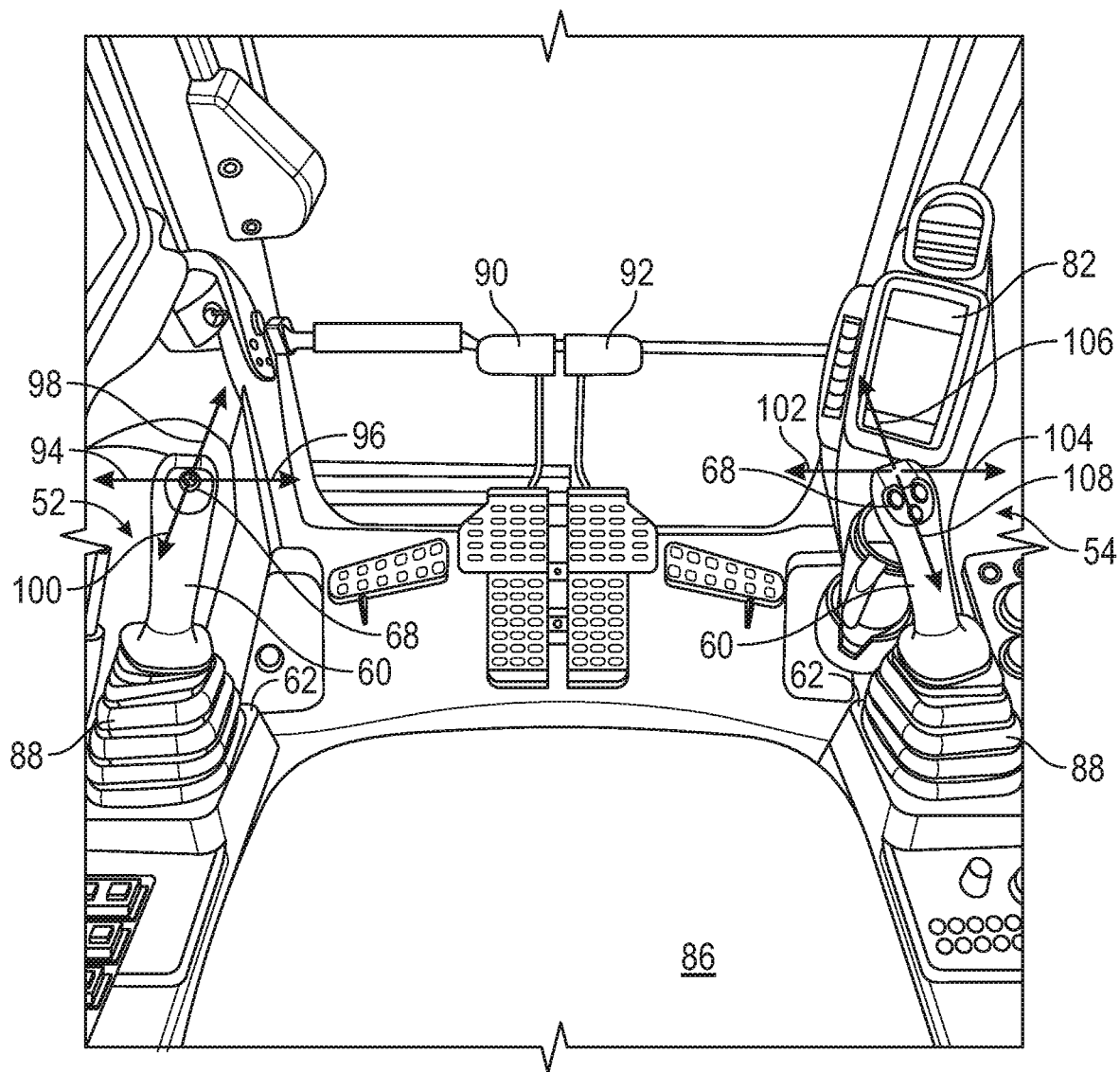
FIG. 2 is a perspective view from within the excavator cabin shown in FIG. illustrating two joystick devices, which may be included in the example MRF joystick system and utilized by an operator to control movement of the excavator boom assembly.

Discussing the joystick configuration or layout of the excavator 20 in greater detail, the number of joystick devices included in the MRF joystick system 22, and the structural aspects and function of such joysticks, will vary amongst embodiments. As previously mentioned, although only a single joystick device 52 is schematically shown in FIG. 1, the MRF joystick system 22 will typically two joystick devices 52, 54 supporting excavator boom assembly control. Further illustrating this point, FIG. 2 provides a perspective view from within the excavator cabin 32 and depicting two MRF joystick devices 52, 54 suitably included in embodiments of the MRF joystick system 22. As can be seen, the MRF joystick devices 52, 54 are positioned on opposing sides of an operator seat 86 such that an operator, using both hands, can concurrently manipulate the left MRF joystick device 52 and the right joystick device 54 with relative ease. Carrying forward the reference numerals introduced above in connection with FIG. 1, each joystick device 52, 54 includes a joystick 60 mounted to a lower support structure or base housing 62 for rotation relative to the base housing 62 about two perpendicular axes. The joystick devices 52, 54 also each include a flexible cover or boot 88 joined between a lower portion of the joysticks 60 and their respective base housings 62. Additional joystick inputs are also provided on each joystick 60 in the form of thumb-accessible buttons and, perhaps, as other non-illustrated manual inputs (e.g., buttons, dials, and or switches) provided on the base housings 62. Other notable features of the excavator 20 shown in FIG. 2 include the previously-mentioned display device 80 and pedal/control lever mechanisms 90, 92 for controlling the respective movement of the right and left tracks of the tracked undercarriage 30.

Different control schemes can be utilized to translate movement of the joysticks 60 included in the joystick devices 52, 54 to corresponding movement of the excavator boom assembly 24. In many instances, the excavator 20 will support boom assembly control in either (and often allow switching between) a "backhoe control" or "SAE control" pattern and an "International Standard Organization" or "ISO" control pattern. In the case of the backhoe control pattern, movement of the left joystick 60 to the operator's left (arrow 94) swings the excavator boom assembly 24 in a leftward direction (corresponding to counter-clockwise rotation of the chassis 28 relative to the tracked undercarriage 30), movement of the left joystick 60 to the operator's right (arrow 96) swings the boom assembly 24 in a rightward direction (corresponding to clockwise rotation of the chassis 28 relative to the tracked undercarriage 30), movement of the left joystick 60 in a forward direction (arrow 98) lowers the hoist boom 34, and movement of the left joystick 60 in an aft or rearward direction (arrow 100) raises the hoist boom 34. Also, in the case of the backhoe control pattern, movement of the right joystick 60 to the left (arrow 102) curls the bucket 26 inwardly, movement of the right joystick 60 to the right (arrow 104) uncurls or "opens" the bucket 26, movement of the right joystick 60 in a forward direction (arrow 106) rotates the dipperstick 36 outwardly, and movement of the right joystick 60 in an aft direction (arrow 108) rotates the dipperstick 36 inwardly. Comparatively, in the case of an ISO control pattern, the joystick motions for the swing commands and the bucket curl commands are unchanged, while the joystick mappings of the hoist boom and dipperstick are reversed. Thus, in the ISO control pattern, forward and aft movement of the left joystick 60 controls the dipperstick rotation in the previously described manner, while forward and aft movement of the right joystick 60 controls motion (raising and lowering) of the hoist boom 34 in the manner described above.

Figure 3:
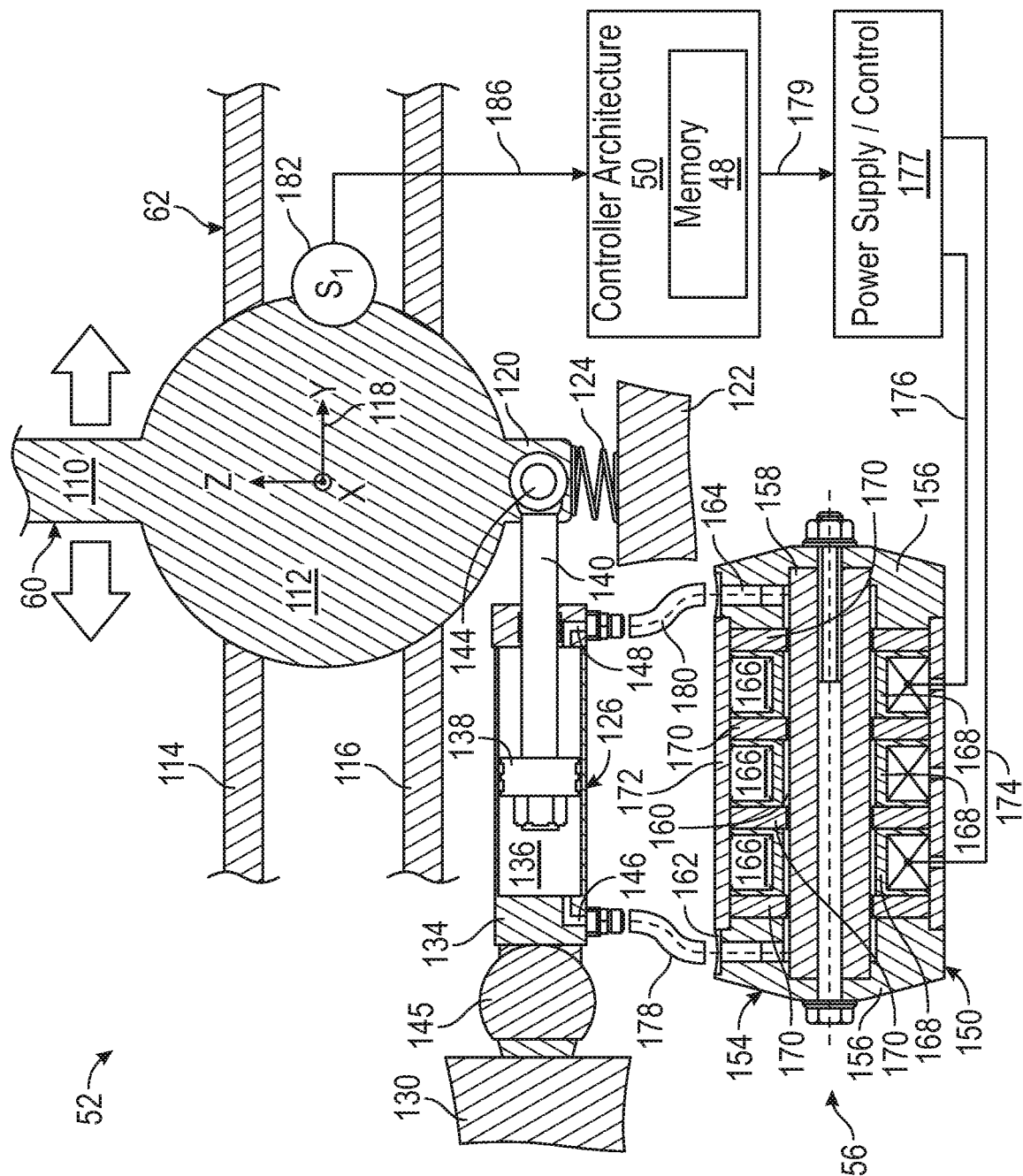
FIGS. 3 and 4 are cross-sectional schematics of the example MRF joystick system, as partially shown and taken along perpendicular section planes through a joystick included in a joystick device, illustrating one possible construction of the MRF joystick system.
Figure 4:
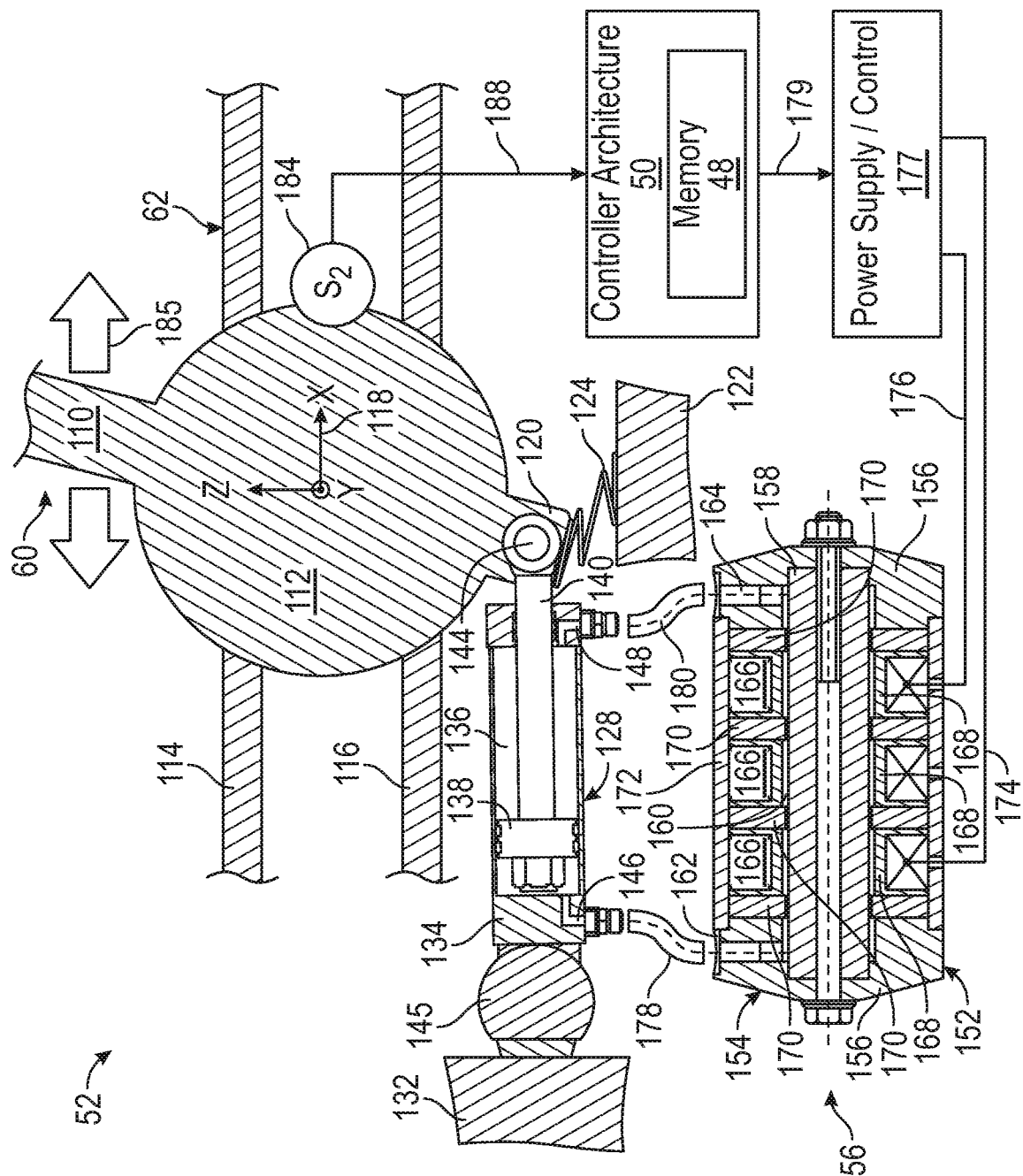

Turning now to FIGS. 3 and 4, an example construction of the MRF joystick device 52 and the MRF joystick resistance mechanism 56 is represented by two simplified cross-sectional schematics. While these drawing figures illustrate a single MRF joystick device (i.e., the MRF joystick device 52), the following description is equally applicable to the other MRF joystick device 54 included in the example MRF joystick system 22. The following description is provided by way of non-limiting example only, noting that numerous different joystick designs incorporating or functionally cooperating with MRF joystick resistance mechanisms are possible. The particular composition of the magnetorheological fluid largely is also inconsequential to embodiments of the present disclosure, providing that meaningful variations in the rheological properties (viscosity) of the magnetorheological fluid occur in conjunction with controlled variations in EM field strength, as described below. For completeness, however, is noted that one magnetorheological fluid composition well-suited for usage in embodiments of the present disclosure contains magnetically-permeable (e.g., carbonyl iron) particles dispersed in a carrier fluid, which is predominately composed of an oil or an alcohol (e.g., glycol) by weight. Such magnetically-permeable particles may have an average diameter (or other maximum cross-sectional dimension if the particles possess a non-spherical (e.g., oblong) shape) in the micron range; e.g., in one embodiment, spherical magnetically-permeable particles are used having an average diameter between one and ten microns. Various other additives, such as dispersants or thinners, may also be included in the magnetorheological fluid to fine-tune the properties thereof.

Referring now to the example joystick construction shown in FIGS. 3 and 4, and again carrying forward the previously-introduced reference numerals as appropriate, the MRF joystick device 52 includes a joystick 60 having at least two distinct portions or structural regions: an upper handle 110 (only a simplified, lower portion of which is shown in the drawing figures) and a lower, generally spherical base portion 112 (hereafter, the "generally spherical base 112"). The generally spherical base 112 of the joystick 60 is captured between two walls 114, 116 of the base housing 62, which may extend substantially parallel to one another to form an upper portion of the base housing 62. Vertically-aligned central openings are provided through the housing walls 114, 116, with the respective diameters of the central openings dimensioned to be less than the diameter of the generally spherical base 112. The spacing or vertical offset between the walls 114, 116 is further selected such that the bulk of generally spherical base 112 is captured between the vertically-spaced housing walls 114, 116 to form a ball-and-socket type joint. This permits rotation of the joystick 60 relative to the base housing 62 about two perpendicular axes, which correspond to the X- and Y-axes of a coordinate legend 118 appearing in FIGS. 3 and 4; while generally preventing translational movement of the joystick 60 along the X-, Y-, and Z-axes of the coordinate legend 118. In further embodiments, various other mechanical arrangements can be employed to mount a joystick to a base housing, while allowing rotation of the joystick about two perpendicular axis, such as a gimbal arrangement. In less complex embodiments, a pivot or pin joint may be provided to permit rotation of the joystick 60 relative to the base housing 62 about a single axis.

The joystick 60 of the MRF joystick device 52 further includes a stinger or lower joystick extension 120, which projects from the generally spherical base 112 in a direction opposite the joystick handle 110. The lower joystick extension 120 is coupled to a static attachment point of the base housing 62 by a single return spring 124 in the illustrated schematic; here noting that such an arrangement is simplified for the purposes of illustration and more complex spring return arrangements (or other joystick biasing mechanisms, if present) will typically be employed in actual embodiments of the MRF joystick device 52. When the joystick 60 is displaced from the neutral or home position shown in FIG. 3, the return spring 124 deflects as shown in FIG. 4 to urge return of the joystick 60 to the home position (FIG. 3). Consequently, as an example, after rotation into the position shown in FIG. 4, the joystick 60 will return to the neutral or home position shown in FIG. 3 under the influence of the return spring 124 should the work vehicle operator subsequently release the joystick handle 110. In other embodiments, the MRF joystick device 52 may not be self-centering and may, instead, assume the form a friction-hold joystick remaining at a particular position absent an operator-applied force moving the joystick from the position.

The example MRF joystick resistance mechanism 56 includes a first and second MRF cylinders 126, 128 shown in FIGS. 3 and 4, respectively. The first MRF cylinder 126 (FIG. 3) is mechanically joined between the lower joystick extension 120 and a partially-shown, static attachment point or infrastructure feature 130 of the base housing 62. Similarly, the second MRF cylinder 128 (FIG. 4) is mechanically joined between the lower joystick extension 120 and a static attachment point 132 of the base housing 62, with the MRF cylinder 128 rotated relative to the MRF cylinder 126 by approximately 90 degrees about the Z-axis of the coordinate legend 118. Due to this structural configuration, the MRF cylinder 126 (FIG. 3) is controllable to selectively resist rotation of the joystick 60 about the X-axis of coordinate legend 118, while the MRF cylinder 128 (FIG. 4) is controllable to selectively resist rotation of the joystick 60 about the Y-axis of coordinate legend 118. Additionally, both MRF cylinders 126, 128 can be jointly controlled to selectively resist rotation of the joystick 60 about any axis falling between the X- and Y-axes and extending within the X-Y plane. In other embodiments, a different MRF cylinder configuration may be utilized and include a greater or lesser number of MRF cylinders; e.g., in implementations in which it is desirable to selectively resist rotation of joystick 60 about only the X-axis or only the Y-axis, or in implementations in which joystick 60 is only rotatable about a single axis, a single MRF cylinder or a pair of antagonistic cylinders may be employed. Finally, although not shown in the simplified schematics, any number of additional components can be included in or associated with the MRF cylinders 126, 128 in further implementations. Such additional components may include sensors for monitoring the stroke of the cylinders 126, 128 if desirably known to, for example, track joystick position in lieu of the below-described joystick sensors 182, 184.

The MRF cylinders 126, 128 each include a cylinder body 134 to which a piston 138, 140 is slidably mounted. Each cylinder body 134 contains a cylindrical cavity or bore 136 in which a head 138 of one of the pistons 138, 140 is mounted for translational movement along the longitudinal axis or centerline of the cylinder body 134. About its outer periphery, each piston head 138 is fitted with one or more dynamic seals (e.g., O-rings) to sealingly engaging the interior surfaces of the cylinder body 134, thereby separating the bore 136 into two antagonistic variable-volume hydraulic chambers. The pistons 138, 140 also each include an elongated piston rod 140, which projects from the piston head 138 toward the lower joystick extension 120 of the joystick 60. The piston rod 140 extends through an end cap 142 affixed over the open end of the cylinder body 134 (again, engaging any number of seals) for attachment to the lower joystick extension 120 at a joystick attachment point 144. In the illustrated example, the joystick attachment points 144 assume the form of pin or pivot joints; however, in other embodiments, more complex joints (e.g., spherical joints) may be employed to form this mechanical coupling. Opposite the joystick attachment points 144, the opposing end of the MRF cylinders 126, 128 are mounted to the respective static attachment points 130, 132 via spherical joints 145. Finally, hydraulic ports 146, 148 are further provided in opposing end portions of each MRF cylinder 126, 128 to allow the inflow and outflow of magnetorheological fluid in conjunction with translational movement or stroking of the pistons 138, 140 along the respective longitudinal axes of the MRF cylinders 126, 128.

The MRF cylinders 126, 128 are fluidly interconnected with corresponding MRF values 150, 152, respectively, via flow line connections 178, 180. As is the case with the MRF cylinders 126, 128, the MRF valves 150, 152 are presented as identical in the illustrated example, but may vary in further implementations. Although referred to as "valves" by common terminology (considering, in particular, that the MRF valves 150, 152 function to control magnetorheological fluid flow), it will be observed that the MRF valves 150, 152 lack valve elements and other moving mechanical parts in the instant example. As a beneficial corollary, the MRF valves 150, 152 provide fail safe operation in that, in the unlikely event of MRF valve failure, magnetorheological fluid flow is still permitted through the MRF valves 150, 152 with relatively little resistance. Consequently, should either or both of the MRF valves 150, 152 fail for any reason, the ability of MRF joystick resistance mechanism 56 to apply resistance forces restricting or inhibiting joystick motion may be compromised; however, the joystick 60 will remain freely rotatable about the X- and Y-axes in a manner similar to a traditional, non-MRF joystick system, and the MRF joystick device 52 will remain capable of controlling the excavator boom assembly 24 as typical.

In the depicted embodiment, the MRF valves 150, 152 each include a valve housing 154, which contains end caps 156 affixed over opposing ends of an elongated cylinder core 158. A generally annular or tubular flow passage 160 extends around the cylinder core 158 and between two fluid ports 162, 164, which are provided through the opposing end caps 156. The annular flow passage 160 is surrounded by (extends through) a number of EM inductor coils 166 (hereafter, "EM coils 166"), which are wound around paramagnetic holders 168 and interspersed with a number of axially- or longitudinally-spaced ferrite rings 170. A tubular shroud 172 surrounds this assembly, while a number of leads are provided through the shroud 172 to facilitate electrical interconnection with the housed EM coils 166. Two such leads, and the corresponding electrical connections to a power supply and control source 177, are schematically represented in FIGS. 3 and 4 by lines 174, 176. As indicated by arrows 179, the controller architecture 50 is operably coupled to the power supply and control source 177 in a manner enabling the controller architecture 50 to control the source 177 to vary the current supplied to or the voltage applied across the EM coils 166 during operation of the MRF joystick system 22. This structural arrangement thus allows the controller architecture 50 to command or control the MRF joystick resistance mechanism 56 to vary the strength of an EM field generated by the EM coils 166. The annular flow passage 160 extends through the EM coils 166 (and may be substantially co-axial therewith) such that the magnetorheological fluid passes through the center the EM field when as the magnetorheological fluid is conducted through the MRF valves 150, 152.

The fluid ports 162, 164 of the MRF valves 150, 152 are fluidly connected to the ports 146, 148 of the corresponding the MRF cylinders 126, 128 by the above-mentioned conduits 178, 180, respectively. The conduits 178, 180 may be, for example, lengths of flexible tubing having sufficient slack to accommodate any movement of the MRF cylinders 126, 128 occurring in conjunction with rotation of the joystick 60. Consider, in this regard, the example scenario of FIG. 4. In this example, an operator has moved the joystick handle 110 in an operator input direction (indicated by arrow 185) such that the joystick 60 rotates about the Y-axis of coordinate legend 118 in a clockwise direction. In combination with this joystick motion, the MRF cylinder 128 rotates about the spherical joint 145 to tilt slightly upward as shown. Also, along with this operator-controlled joystick motion, the piston 138, 140 contained in the MRF cylinder 128 retracts such that the piston head 138 moves to the left in FIG. 4 (toward the attachment point 132). The translation movement of the piston 138, 140 forces magnetorheological fluid flow through the MRF valve 152 to accommodate the volumetric decrease of the chamber on the left of the piston head 138 and the corresponding volumetric increase of the chamber to the right of the piston head 138. Consequently, at any point during such an operator-controlled joystick rotation, the controller architecture 50 can vary the current supplied to or the voltage across the EM coils 166 to vary the force resisting magnetorheological fluid flow through the MRF valve 152 and thereby achieve a desired MRF resistance force resisting further stroking of the piston 138, 140.

Given the responsiveness of MRF joystick resistance mechanism 56, the controller architecture 50 can control the resistance mechanism 56 to only briefly apply such an MRF resistance force, to increase the strength of the MRF resistance force in a predefined manner (e.g., in a gradual or stepped manner) with increasing piston displacement, or to provide various other resistance effects (e.g., a tactile detent or pulsating effect), as discussed in detail below. The controller architecture 50 can likewise control the MRF joystick resistance mechanism 56 to selectively provided such resistance effects as the piston 138, 140 included in the MRF valve 150 strokes in conjunction with rotation of the joystick 60 about the X-axis of coordinate legend 118. Moreover, the MRF joystick resistance mechanism 56 may be capable of independently varying the EM field strength generated by the EM coils 166 within the MRF valves 150, 152 to allow independent control of the MRF resistance forces inhibiting joystick rotation about the X- and Y-axes of coordinate legend 118.

The MRF joystick device 52 may further contain one or more joystick position sensors 182, 184 (e.g., optical or non-optical sensors or transformers) for monitoring the position or movement of the joystick 60 relative to the base housing 62. In the illustrated example, specifically, the MRF joystick device 52 includes a first joystick position sensor 182 (FIG. 3) for monitoring rotation of the joystick 60 about the X-axis of coordinate legend 118, and a second joystick position sensor 184 (FIG. 4) for monitoring rotation of the joystick 60 about the Y-axis of coordinate legend 118. The data connections between the joystick position sensors 182, 184 and the controller architecture 50 are represented by lines 186, 188, respectively. In further implementations, the MRF joystick device 52 can include various other non-illustrated components, as can the MRF joystick resistance mechanism 56. Such components can include operator inputs and corresponding electrical connections provided on the joystick 60 or the base housing 62, AFF motors, and pressure and/or flow rate sensors included in the flow circuit of the MRF joystick resistance mechanism 56, as appropriate, to best suit a particular application or usage.

As previously emphasized, the above-described embodiment of the MRF joystick device 52 is provided by way of non-limiting example only. In alternative implementations, the construction of the joystick 60 can differ in various respects. So too may the MRF joystick resistance mechanism 56 differ in further embodiments relative to the example shown in FIGS. 3 and 4, providing that the MRF joystick resistance mechanism 56 is controllable by the controller architecture 50 to selectively apply a resistance force (through changes in the rheology of a magnetorheological fluid) inhibiting movement of a joystick relative to a base housing in at least one DOF. In further realizations, EM inductor coils similar or identical to the EM coils 166 may be directly integrated into the MRF cylinders 126, 128 to provide the desired controllable MRF resistance effect. In such realizations, magnetorheological fluid flow between the variable volume chambers within a given MRF cylinder 126, 128 may be permitted via the provision of one or more orifices through the piston head 138, by providing an annulus or slight annular gap around the piston head 138 and the interior surfaces of the cylinder body 134, or by providing flow passages through the cylinder body 134 or sleeve itself. Advantageously, such a configuration may impart the MRF joystick resistance mechanism with a relatively compact, integrated design. Comparatively, the usage of one or more external MRF valves, such as the MRF valves 150, 152 (FIGS. 3 and 4), may facilitate cost-effective manufacture and allow the usage of commercially-available modular components in at least some instances.

In still other implementations, the design of the MRF joystick device may permit the magnetorheological fluid to envelop and act directly upon a lower portion of the joystick 60 itself, such as the spherical base 112 in the case of the joystick 60, with EM coils positioned around the lower portion of the joystick and surrounding the magnetological fluid body. In such embodiments, the spherical base 112 may be provided with ribs, grooves, or similar topological features to promote displacement of the magnetorheological fluid in conjunction with joystick rotation, with energization of the EM coils increasing the viscosity of the magnetorheological fluid to impede fluid flow through restricted flow passages provided about the spherical base 112 or, perhaps, due to sheering of the magnetorheological fluid in conjunction with joystick rotation. Various other designs are also possible in further embodiments of the MRF joystick system 22.

Regardless of the particular design of the MRF joystick resistance mechanism 56, the usage of MRF technology to selectively generate a variable MRF resistance force or joystick stiffness inhibiting (resisting or preventing) unintended joystick motions provides several advantages. As a primary advantage, the MRF joystick resistance mechanism 56 (and MRF joystick resistance mechanism generally) are highly responsive and can effectuate desired changes in EM field strength, in the rheology of the magnetorheological fluid, and ultimately in the MRF-applied joystick stiffness inhibiting joystick motions in highly abbreviated time periods; e.g., time periods on the order of 1 millisecond in certain instances. Correspondingly, the MRF joystick resistance mechanism 56 may enable the MRF resistance force to be removed (or at least greatly reduced) with an equal rapidity by quickly reducing current flow through the EM coils and allowing the rheology of the magnetorheological fluid (e.g., fluid viscosity) to revert to its normal, unstimulated state. The controller architecture 50 can further control the MRF joystick resistance mechanism 56 to generate the MRF resistance force to have a continuous range of strengths or intensities, within limits, through corresponding changes in the strength of the EM field generated utilizing the EM coils 166. Beneficially, the MRF joystick resistance mechanism 56 can provide reliable, essentially noiseless operation over extended time periods. Additionally, the magnetorheological fluid can be formulated to be non-toxic in nature, such as when the magnetorheological fluid contains carbonyl iron-based particles dispersed in an alcohol-based or oil-based carrier fluid, as previously described. Finally, as a still further advantage, the above-described configuration of the MRF joystick resistance mechanism 56 allows the MRF joystick system 22 to selectively generate a first resistance force or joystick stiffness deterring joystick rotation about a first axis (e.g., the X-axis of coordinate legend 118 in FIGS. 3 and 4), while further selectively generating a second resistance force or joystick stiffness deterring joystick rotation about a second axis (e.g., the Y-axis of coordinate legend 118) independently of the first resistance force (joystick stiffness); that is, such that the first and second resistance forces have different magnitudes, as desired.

Figure 5:
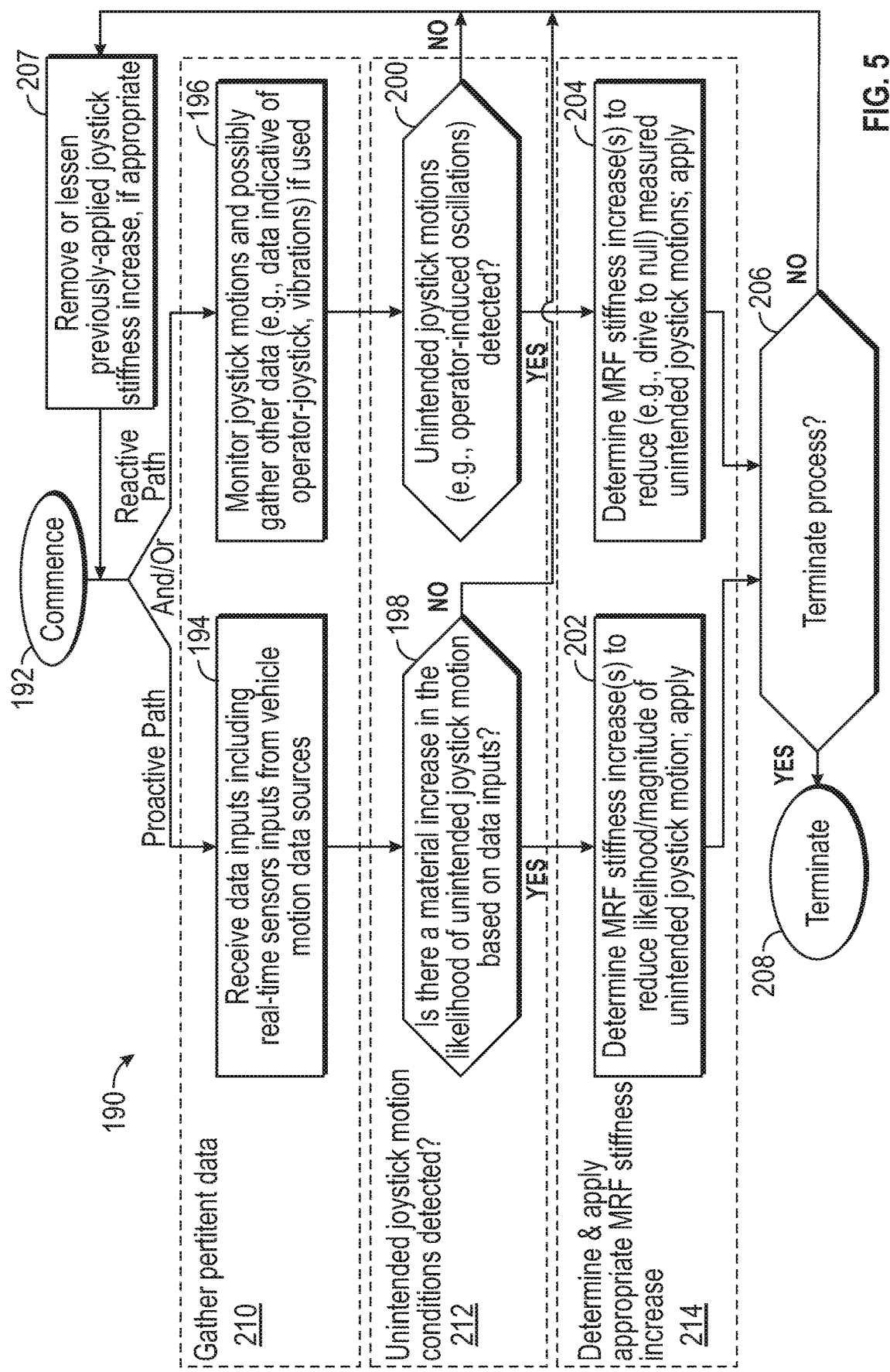
FIG. 5 is a process suitably carried-out by a controller architecture of the MRF joystick system to selectively increase joystick stiffness in a manner reducing unintended joystick motions.

Advancing next to a discussion of FIG. 5, there is presented an example process 190 suitably carried-out by the controller architecture 50 of the work vehicle MRF joystick system 22 to reduce unintended joystick motions through strategically-applied MRF increases in joystick stiffness. The process 190 (hereafter, the "unintended joystick motion inhibition process 190") includes a number of process STEPS 192, 194, 196, 198, 200, 202, 204, 206, each of which is described, in turn, below. Depending upon the particular manner in which the unintended joystick motion inhibition process 190 is implemented, each step generically illustrated in FIG. 5 may entail a single process or multiple sub-processes. Further, the steps illustrated in FIG. 5 and described below are provided by way of non-limiting example only. In alternative embodiments of the unintended joystick motion inhibition process 190, additional process steps may be performed, certain steps may be omitted, and/or the illustrated process steps may be performed in alternative sequences.

Two control scheme paths are shown in the example of FIG. 5: a proactive control scheme path (hereafter, "proactive path 194, 198, 202"), and a reactive control scheme path (hereafter, "reactive path 196, 200, 204"). In embodiments, the controller architecture 50 of the MRF joystick system 22 may carrying-out one or both of these control scheme paths when performing the unintended joystick motion inhibition process 190, as conducted in accordance with the computer-readable instructions stored in the memory 48. Moreover, as also indicated by blocks 210, 212, 214, corresponding steps included in the proactive path 194, 198, 202, and in the reactive path 196, 200, 204 can be grouped into generic steps or "step blocks" performed during the unintended joystick motion inhibition process 190. For example, as indicated in FIG. 5 at a step block 210, STEPS 194, 196 can be generally described as the step of gathering pertinent data or information; that is, data considered by the controller architecture 50 in performing the remainder of the unintended joystick motion inhibition process 190. As indicated at a step block 212, STEPS 198, 200 may be generically described as the step or query of assessing whether unintended joystick motions are conditions are presently detected by the controller architecture 50 based upon the data gathered during step block 210. The answer to this query, posed at step block 212, determines whether the controller architecture 50 returns to the step block 210 and again collects (real-time) data or instead advances to the final step block 212. Lastly, as indicated at the step block 214 in FIG. 5, STEPS 202, 204 can generally described in terms of determining an appropriate MRF-applied joystick stiffness increase under a given set of circumstances, with such a stiffness increase potentially involving the application of two different stiffness increases to a joystick device when the joystick of the device is rotatable about perpendicular axes or otherwise moveable in multiple DOFs. The determined joystick stiffness increase is then implemented through corresponding commands transmitted from the controller architecture 50 to the MRF joystick resistance mechanism 56 to effectuate the desired change in magnetorheological fluid viscosity, as described below and throughout this document.

The unintended joystick motion inhibition process 190 commences at STEP 192 in response to the occurrence of a predetermined trigger event. Such a trigger event can be, for example, startup of the work vehicle on which the MRF joystick system is deployed (e.g., the excavator 20 shown in FIG. 1) or the reception of an operator input expressly activating the unintended joystick motion inhibition process 190; e.g., operator input selecting an increased joystick stiffness mode from an operator customization menu of the GUI generated on the display device 80. In other instances, the unintended joystick motion inhibition process 190 may commence when the controller architecture 50 detects one or more conditions associated with an increased likelihood of disturbance force generation during impending operation of the excavator 20 (or other work vehicle at issue). A non-exhaustive list of such conditions includes the attachment of a particular implement (e.g., a hydraulic hammer) to the terminal end of the boom assembly 24, as determined based on operator input or data received from any implement auto-detect sensors (if present); travel of the work vehicle at higher speeds (as may be more pertinent in the context of work vehicles having higher speed ranges, such as sprayers, loaders, and motor graders); or determining that the work vehicle is located in an work area characterized by a terrain or surface type likely to exacerbate the generation of vibrations during work vehicle travel (or otherwise historically prone to the generation of disturbance forces).

After commencing the unintended joystick motion inhibition process 190, the controller architecture 50 may follow either or both of the proactive path 194, 198, 200 and the reactive path 196, 200, 202, as previously mentioned. Addressing first the proactive path 194, 198, 200, the controller architecture 50 collects the relevant data inputs subsequently weighed in determining whether disturbance forces sufficient to induce unintended joystick motions are likely to occur in a near-term timeframe (STEP 194). Such data inputs can include information pertaining to the occurrence and characteristics (e.g., magnitude and directionality) of sensed disturbance forces imparted to the excavator 20 (or other work vehicle) at a location remote from the MRF joystick devices 52, 54. Such disturbance forces can include impact forces measured by the inertia sensors 72 when, for example, the excavator bucket 26 is impacted against a hard, motion-resistant surface, such as a wall of a freestanding structure or hardened terrain, during the performing a particular work task. In other instances, data may be gathered during STEP 194 indicative of inertia changes of the excavator 20 including any abrupt changes in the speed (e.g., due to rapid acceleration or deceleration), heading (e.g., due to sharp cornering), or orientation of the work vehicle (e.g., due to pronounced changes in the topology of the ground or materials traversed by the work vehicle), as reported by the vehicle motion data sources 74. Again, abrupt changes in speed and heading may be more pertinent when the MRF joystick system is deployed onboard a work vehicle capable of high speed travel.

Data indicative of conditions associated with an increased likelihood of unintended joystick motion may also be considered during STEP 194 in embodiments. Such data can include information identifying the type of implement or tool currently attached to (or in active usage by) the work vehicle, which may potentially warrant an increase in joystick stiffness if the implement type is prone to the generation of disturbance forces during usage. For example, in the case of the excavator 20, data indicating whether a hydraulic hammer has been attached to the boom assembly 24 may be gathered during STEP 194, whether utilizing an auto-detect approach (if suitable sensors 82 are integrated into the excavator 20) or by receiving operator input specifying the currently-attached implement type. Additionally or alternatively, the controller architecture 50 may gather data indicating whether the work vehicle has entered a particular work environment or is being operated in a manner (e.g., at higher speeds) associated with an increased likelihood of disturbance force generation during STEP 194. Such data may be reported to the controller architecture 50 by the vehicle motion data sources 74 in the manner previously described. Various other relevant data inputs may also be gathered during STEP 194. For example, in instances in which an operator provides input indicating that disturbance force generation is likely to occur in a near-term timeframe, or in instances in which an operator is permitted to activate a joystick stiffening mode and the operator does so, the controller architecture 50 may gather such data inputs for consideration during STEP 198 of the proactive path 194, 198, 202 of the unintended joystick motion inhibition process 190, as described below.

Next, at STEP 198 of the unintended joystick motion inhibition process 190, the controller architecture 50 determines whether there exists an undesirably high likelihood of unintended joystick motions based on the data gathered during STEP 194. For example, when an impact or shock force is detected during STEP 194, the controller architecture 50 may determine whether the magnitude of such a shock force surpasses a predetermined threshold value, which may specify a tolerance threshold (essentially, a high pass filter) permitting the occurrence of low level vibrations unlikely to result in operationally-meaningful unintended joystick motions. Further, in certain embodiments, the controller architecture 50 may also consider vector data indicating the primary direction along with the shock force is propagating and/or the location of the detected impact force to estimate dissipation prior propagation to the MRF joystick devices 52, 54. Similarly, in the case of inertia changes resulting from abrupt acceleration, deceleration, turning, or orientation change of the work vehicle, the controller architecture 50 may consider the magnitude (and possible vector data) of such inertia changes to determine whether such forces pose an undesirably high risk of unintended joystick motions. If determining that a material increase in the likelihood of unintended joystick motion exists based on such data inputs, the controller architecture 50 progresses to STEP 202 of the unintended joystick motion inhibition process 190. Otherwise, the controller architecture 50 returns to STEP 194 of the proactive path 194, 198, 202 (and to STEP 196 of the reactive path 196, 200, 204, if practiced) and continues to monitor the real-time sensor inputs and other data for an occurrence of unintended joystick motion conditions. In certain instances, and as previously indicated, an operator may be permitted to activate a joystick stiffening mode by, for example, interaction with a GUI generated on the display device 80. In such instances, the controller architecture 50 may automatically advance to STEP 202 of the proactive control path 194, 198, 202 when such a joystick stiffness mode is available and activated by the work vehicle operator.

At STEP 202, the controller architecture 50 determines or establishes a joystick stiffness increase appropriate to minimize the likelihood of unintended joystick motions, given the characteristics of the unintended joystick motion conditions detected at STEP 198. The controller architecture 50 then commands the MRF resistance mechanism 56 to apply the determined stiffness increase. In certain embodiments, the controller architecture 50 may command the MRF resistance mechanism 56 to increase the joystick stiffness by an amount substantially proportional to the magnitude of the disturbance force detected during STEP 194. In such instances, the controller architecture 50 may command the MRF joystick resistance mechanism 56 to provide a lower stiffness increase when a detected disturbance force is of a lesser magnitude, providing that the magnitude of the disturbance force rises above the above-described predetermined threshold value or high pass filter. Comparatively, the controller architecture 50 may command the MRF joystick resistance mechanism 56 to provide greater stiffness increases when a detected disturbance force is of a larger magnitude or higher amplitude. In either instance, the controller architecture 50 usefully acts in a prompt manner to command the MRF joystick resistance mechanism 56 to increase the joystick stiffness prior to or substantially concurrently with propagation of the impact force to the joystick devices 52, 54. In so doing, the MRF joystick system 22 effectively braces the joystick devices 52, 54 to resist unintended joystick motions immediately ahead of (or substantially concomitantly with) transmission of the shock force or disturbance force to the operator station, the operator, and the joystick devices 52, 54.

In embodiments, it is also possible for the controller architecture 50 to consider the directionality of any disturbance force when determining the appropriate MRF-applied joystick stiffness increase or increases to apply during STEP 204 of the unintended joystick motion inhibition process 190. For example, if the disturbance force is propagating essentially in a fore-aft direction relative to the work vehicle chassis 28 (e.g., as may be the case when the boom assembly 24 is utilized to repeated impact the bucket 26 downwardly on a surface), the controller architecture 50 may command the MRF resistance mechanism 56 to provide a greater stiffness increase resisting rotation of the joysticks 60 about a first rotational axis (corresponding to the arrows 98, 100, 106, 108 in FIG. 2), while providing a lesser stiffness increase (if any stiffness increase) resisting rotation of the joysticks 60 about the second rotational axis (corresponding to the arrows 94, 96, 102, 104 in FIG. 2). In other instances, the controller architecture 50 may not provide such independent adjustments in joystick stiffness about different rotational axis. Also, as noted above, the controller architecture 50 may determine the appropriate increases in joystick stiffness based, in part, on joystick position reported by the position sensors 66; e.g., in the case of a self-centering joystick having detent features, the controller architecture 50 may increase joystick stiffness to effectively increase the detent hold force and reduce the likelihood of dislodgement of the joystick from a detent position when a joystick presently resides in such a detent position. Following STEP 202, the controller architecture 50 advances to STEP 206 and determines whether the unintended joystick motion inhibition process 190, as described below.

Turning now a description of the reactive path 196, 200, 204 of the unintended joystick motion inhibition process 190, again this path may or may not be performed in conjunction with the above-described proactive path 194, 198, 202 in embodiments. When performed, the reactive path 196, 200, 204 commences with STEP 196 during which the controller architecture 50 gathers data inputs indicative of any currently-occurring joystick motions. Such data includes joystick movement data measured by the joystick position sensors 66 integrated into the MRF joystick devices 52, 54. Additionally, in certain instances, data measuring vibrational forces currently imparted to the excavator 20, as reported by the inertia sensors 72, may be considered during STEP 196. So too may any data indicating whether an operator in currently grasping one or both of the joysticks 60 contained in the MRF joystick devices 52, 54; e.g., as indicated by capacitive touch sensors integrated into the MRF joystick devices 52, 54, or visual analysis of one or more cameras located within the work vehicle cabin and having a view of the joystick devices 52, 54.

At STEP 200, the controller architecture 50 assess the data gathered during STEP 196 to determine whether joystick motions, when sensed by the joystick position sensors 66, are intentionally caused by an operator of the excavator 20. For example, in embodiment, the controller architecture 50 may identify when joystick motions sensed by the joystick position sensors 66 are, in fact, OIO of one or both of the joysticks 60 contained in the MRF joystick devices 52, 54 and thus unintentionally caused by the work vehicle operator. The controller architecture 50 may render this determination by considering the regularity, direction, and magnitude of the detected joystick motions; e.g., by comparing the pattern of joystick movements to a representative OIO displacement pattern or waveform stored in the memory 48. The controller architecture 50 may further any data indicating the magnitude of vibrations currently transmitted to the excavator chassis 28 to determine whether OIO of the joystick(s) 60 is presently occurring. The controller architecture 50 may consider other forms of unintended joystick motions during STEP 196 in addition to or in lieu of OIO joystick motions. For example, in some implementations, the controller architecture 50 may consider whether unintentional slippage of one or both of the joystick 60 from a detent position has occurred. This may be indicated by displacement of a given joystick 60 from a detent position without operator contact, as may be determined utilizing any of the above-described sensors 82 capable of monitoring physical contact between the operator and the joystick 60. This may also be indicated by data entered into the MRF joystick system 22 by an operator utilizing the operator interface 78 reporting issues concerning detent slippage. Similarly, slippage of the joystick or joysticks under consideration may also be evaluated utilizing a similar approach in implementations in which a joystick device has a friction-hold configuration and unintended joystick motion (in the form of joystick drift) may occur as a result of disturbance forces imparted to the work vehicle.

Advancing to STEP 204 of the unintended joystick motion inhibition process 190, the controller architecture 50 next commands the MRF joystick resistance mechanism 56 to increase joystick stiffness by a controlled amount in an attempt to reduce or eliminate the ongoing unintended joystick motions. In embodiments, the controller architecture 50 may initially apply a low level or moderate increase in joystick stiffness to determine if such an increase in joystick stiffness is sufficient to suppress the detected unintended joystick motions. In other instances, the initially-applied increase in joystick stiffness may be variable, with the controller architecture 50 determining the magnitude of the joystick stiffness increase based on the severity of the currently-detected unintended joystick motions. Also, as previously noted, the controller architecture 50 can potentially apply multiple different stiffness increases to a given joystick (e.g., a first joystick stiffness increase resisting joystick rotation about a first axis, and a second joystick stiffness increase resisting joystick rotation about a second axis perpendicular to the first axis) in embodiments in which the MRF joystick resistance mechanism 56. Finally, during STEP 204, the controller architecture 50 command the MRF resistant mechanism 56 to increase the detent hold force maintaining the joystick or joysticks 60 in detent positions (when the joystick resides therein) when determining that joystick slippage from a detent position has previously occurred, in the case of a self-centering joystick device having detent positions. Similarly, in the case of a friction-hold joystick device, the controller architecture 50 may command the MRF joystick resistance mechanism 56 to increase joystick stiffness in one or more DOFs when determining that joystick drift has occurred in the absence of operator contact with the joystick.

If, at STEP 204, the unintended joystick motion continue despite a previously-applied stiffness increase, the controller architecture 50 may command the MRF joystick resistance mechanism 56 to increase the MRF stiffness force resisting joystick motion in at least one DOF. The controller architecture 50 may command the MRF joystick resistance mechanism to increase the applied joystick stiffness in a gradual (continuous or stepwise) manner until the detected unintended joystick motions cease, until such joystick motions are brought to an acceptable level, or until a maximum desirable MRF stiffness force is reached. Thus, in the case of sensed OIO of the joystick, the controller architecture 50 may repeatedly estimate a magnitude of the operator-induced oscillations and then progressively increase the first joystick stiffness until the magnitude of the operator-induced oscillations of the joystick decreases below a predetermined acceptance threshold. In the case of detent slippage, the controller architecture 50 may command the MRF resistance mechanism 56 to increase the detent hold force to a predetermined level; and further increase the detent hold force, as needed, if repeated displacement of the joystick from the detent positions absent operator contact is detected. Thus, across multiple iterations of the unintended joystick motion inhibition process 190, the controller architecture 50 may continue to progressively increase the detent hold force until detent slippage is no longer detected or reported by the work vehicle operator. After effectuating any or all of above-described joystick stiffness increases, the controller architecture 50 advances to STEP 206 of the unintended joystick motion inhibition process 190 and determines whether the present iteration of process 190 should terminate, as described below.

After STEP 202 and/or STEP 206, the controller architecture 50 advances to STEP 206 and determines whether the current iteration of the unintended joystick motion inhibition process 190 should terminate; e.g., due to work vehicle shutdown or due to removal of the condition or trigger event motivation commencement of the process 190. If determining that the unintended joystick motion inhibition process 190 should terminate at STEP 206, the controller architecture 50 progresses to STEP 208 of the process 190, and the process 190 terminates accordingly. If instead determining that the unintended joystick motion inhibition process 190 should continue, the controller architecture 50 returns to STEP 194 of the proactive path 194, 198, 202, and/or to STEP 196 of the reactive control path 196, 200, 204 and the above-described process steps repeat. Additionally, prior to returning to STEP 194 and/or STEP 196, the controller architecture 50 may also determine whether any currently-applied joystick stiffness increase should be reduced or removed at STEP 207. For example, at STEP 207, the controller architecture 50 may determine that any currently-applied joystick stiffness increase should be removed due to the cessation of the unintended joystick motion conditions, which previously motivated an increase in joystick stiffness. Similarly, in embodiments in which the controller architecture 50 commands MRF joystick stiffness increases to reduce or eliminate unintended joystick motions that are presently occurring (e.g., OIO of a joystick), the controller architecture 50 may determine whether a predetermined time period has elapsed (e.g., a few seconds) without detection of any unintended joystick motions; and, if so determining, remove or lessen any previously-applied increase in joystick stiffness. In this manner, the controller architecture 50 may selectively apply such increases in joystick stiffness on an as-needed basis to counter or buffer against unintended joystick motions. Otherwise, the stiffness of the joystick device or devices can be maintained at lower levels to provide operators with an optimized joystick interactive experience reducing operator fatigue and improving operator satisfaction levels.

Figure 6:
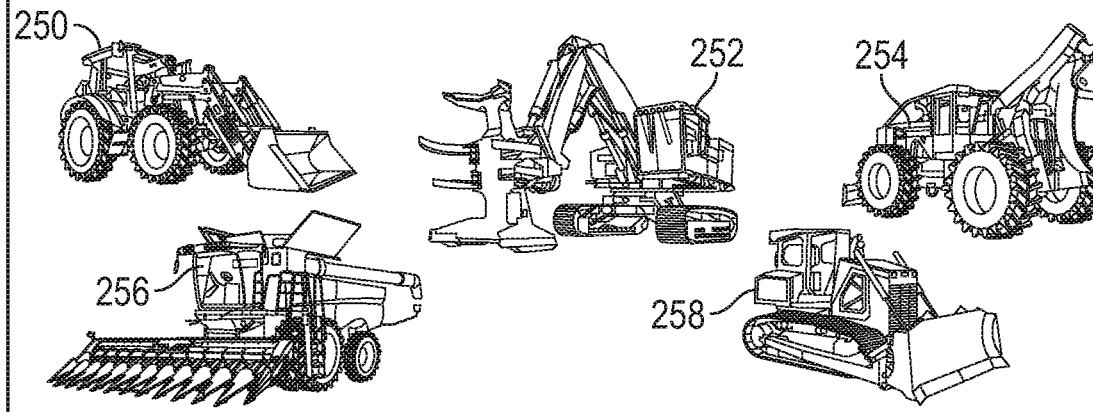
FIG. 6 is a graphic illustrating, in a non-exhaustive manner, additional example work vehicles into which embodiments of the MRF joystick system may be beneficially integrated.

Additional Examples of Work Vehicles Beneficially Equipped with MRF Joystick Systems The foregoing has thus described examples of MRF joystick systems configured to selectively restrict joystick motion to reduce unintended joystick motions through intelligently-applied, MRF-effectuated variations in joystick stiffness. While the foregoing description principally focuses on a particular type of work vehicle (an excavator) including a particular joystick-controlled work vehicle function (boom assembly movement), embodiments of the MRF joystick system described herein are amenable to integration into a wide range of work vehicles containing joystick devices susceptible to unintended joystick motions. Three additional examples of such work vehicles are set-forth in the upper portion of FIG. 6 and include a wheeled loader 216, a skid steer loader (SSL) 218, and a motor grader 220. Addressing first the wheeled loader 216, the wheeled loader 216 may be equipped with an example MRF joystick device 222 located within the cabin 224 of the wheeled loader 216. As indicated in FIG. 6, the MRF joystick device 222 may be utilized to control the movement of a FEL 226 terminating in a bucket 228; the FEL 226, and front end loaders generally, considered a type of "boom assembly" in the context of this document. Comparatively, two MRF joystick devices 230 may be located in the cabin 232 of the example SSL 218 and utilized to control not only the movement of the FEL 234 and its bucket 236, but further control movement of the chassis 238 of the SSL 218 in the well known manner. Finally, the motor grader 220 likewise includes two MRF joystick devices 240 located within the cabin 242 of the motor grader 220. The MRF joystick devices 240 can be utilized to control the movement of the motor grader chassis 244 (through controlling a first transmission driving the motor grader rear wheels and perhaps a second (e.g., hydrostatic) transmission driving the forward wheels), as well as movement of the blade 246 of the motor grader; e.g., through rotation of and angular adjustments to the blade-circle assembly 248, as well as adjustments to the side shift angle of the blade 246.

In each of the above-mentioned examples, the MRF joystick devices can be controlled to reduce unintended joystick motions through intelligent MRF-applied variations in joystick stiffness. In this regard, any or all of the example wheeled loader 216, the SSL 218, and the motor grader 220 can be equipped with a work vehicle MRF joystick system including at least one joystick device, an MRF joystick resistance mechanism, and a controller architecture. Further, as described above, the controller architecture may be detect when unintended joystick motion conditions occur during operation of the work vehicle at issue, whether such unintended joystick motion conditions are characterized by presently-occurring unintended joystick motions (e.g., OIO of a joystick) or an undesirably high likelihood of unintended joystick motions occurring in a near future timeframe; e.g., due to a sensed impact force imparted to a boom assembly-mounted tool or other portion the work vehicle, abrupt inertia changes of the work vehicle, operation of the work vehicle in conditions associated with disturbance force generation, attachment or usage of an implement or tool prone to disturbance force generation, or the any of the other conditions described throughout this document. Finally, still further examples of work vehicles usefully equipped with embodiments of the MRF joystick systems described herein are illustrated in a bottom portion of FIG. 6 and include an FEL-equipped tractor 250, a feller buncher 252, a skidder 254, a combine 256, and a dozer 258.

Enumerated Examples of the Work Vehicle MRF Joystick System

The following examples of the work vehicle MRF joystick system are further provided and numbered for ease of reference.

1. In embodiments, a work vehicle magnetorheological fluid (MRF) joystick system includes a joystick device, an MRF joystick resistance mechanism, and a controller architecture. The joystick device includes, in turn, a base housing, a joystick movably mounted to the base housing, and a joystick position sensor configured to monitor movement of the joystick relative to the base housing. The MRF joystick resistance mechanism is controllable to vary a first joystick stiffness resisting movement of the joystick relative to the base housing in at least one degree of freedom. Coupled to the joystick position sensor and to the MRF joystick resistance mechanism, the controller architecture is configured to: (i) detect when unintended joystick motion conditions occur during operation of the work vehicle; and (ii) when detecting unintended joystick motion conditions, command the MRF joystick resistance mechanism to increase the first joystick stiffness in a manner reducing susceptibility of the joystick device to unintended joystick motions.

2. The work vehicle MRF joystick system of example 1, wherein the controller architecture is configured to detect when unintended joystick motion conditions occur during work vehicle operation by determining whether joystick motions, when sensed by the joystick position sensor, are intentionally caused by an operator of the work vehicle.

3. The work vehicle MRF joystick system of example 2, wherein the controller architecture is further configured to: (i) identify when joystick motions sensed by the joystick position sensor include operator-induced oscillations of the joystick; and (ii) determine that the joystick motions are unintentionally caused by the work vehicle operator when the joystick motions include operator-induced oscillations of the joystick.

4. The work vehicle MRF joystick system of example 3, wherein the controller architecture is further configured to: (i) when identifying the joystick motions include operator-induced oscillations of the joystick, estimate a magnitude of the operator-induced oscillations; and (ii) progressively increase the first joystick stiffness until the magnitude of the operator-induced oscillations of the joystick decreases below a predetermined acceptance threshold.

5. The work vehicle MRF joystick system of example 1, further including a disturbance force sensor affixed to the work vehicle at a location remote from the joystick device and coupled to the controller architecture. The controller architecture is configured to detect when unintended joystick motion conditions occur during operation of the work vehicle when the disturbance force sensor detects a disturbance force having a magnitude exceeding a predetermined threshold.

6. The work vehicle MRF joystick system of example 5, wherein the controller architecture is further configured to command the MRF joystick resistance mechanism to increase the first joystick stiffness by an amount substantially proportional to the magnitude of the disturbance force detected by the disturbance force sensor.

7. The work vehicle MRF joystick system of example 1, further including a disturbance force sensor affixed to the work vehicle and coupled to the controller architecture. The controller architecture is further configured to: (i) monitor for impact forces detected by the disturbance force sensor and having magnitudes exceeding a predetermined threshold; and (ii) when the disturbance force sensor detects an impact force having a magnitude exceeding the predetermined magnitude threshold, command the MRF joystick resistance mechanism to increase the first joystick stiffness prior to or substantially concurrently with propagation of the impact force to the joystick device.

8. The work vehicle MRF joystick system of example 7, wherein the disturbance force sensor is integrated into a boom assembly attached to a chassis of the work vehicle. The controller architecture is configured to monitor for impact forces detected by the disturbance force sensor during usage of the boom assembly.

9. The work vehicle MRF joystick system of example 1, further including a vehicle motion data source coupled to the controller architecture. The controller architecture is configured to detect when unintended joystick motion conditions occur by on detecting abrupt changes in a speed, heading, or orientation of the work vehicle utilizing data from the vehicle motion data source.

10. The work vehicle MRF joystick system of example 1, wherein the controller architecture is configured to detect when unintended joystick motion conditions occur based, at least in part, on usage of a particular implement type by the work vehicle.

11. The work vehicle MRF joystick system of example 1, wherein the joystick device includes a detent position having a detent hold force. The controller architecture is configured to command the MRF joystick resistance mechanism to increase the hold force of the detent position when detecting unintended joystick motion conditions.

12. The work vehicle MRF joystick system of example 1, wherein the joystick device is rotatable relative to the base housing about a first axis and about a second axis perpendicular to the first axis. The first joystick stiffness is a force resisting rotation of the joystick device about at least the first axis.

13. The work vehicle MRF joystick system of example 12, wherein the MRF joystick resistance mechanism is further controllable to vary a second joystick stiffness resisting rotation of the joystick about the second axis. The controller architecture is configured to selectively command the MRF joystick resistance mechanism to vary the first joystick stiffness independently of the second joystick stiffness.

14. The work vehicle MRF joystick system of example 1, further including an operator interface coupled to the controller architecture. The controller architecture is configured to detect when unintended joystick motion conditions occur based, at least in part, on operator input entered via the operator interface indicating that elevated disturbance forces are likely to occur during impending operation of the work vehicle.

15. In further embodiments, the work vehicle MRF joystick system includes a joystick device, an MRF joystick resistance mechanism, and a controller architecture. The joystick device contains a base housing, a joystick movably mounted to the base housing, and a joystick position sensor configured to monitor movement of the joystick relative to the base housing. The controller architecture is coupled to the joystick position sensor and to the MRF joystick resistance mechanism, which is controllable to vary a joystick stiffness resisting movement of the joystick relative to the base housing in at least one degree of freedom. The controller architecture is configured to: (i) determine when unintended joystick motions of the joystick are presently occurring based, at least in part, on data provided by the joystick position sensor; and (ii) when determining that unintended joystick motions are presently occurring, command the MRF joystick resistance mechanism to increase the joystick stiffness in a manner reducing the unintended joystick motions.

CONCLUSION

The foregoing has thus provided work vehicle MRF joystick systems configured\to reduce unintended joystick motions through intelligent MRF-applied variations in joystick stiffness. Through the strategic application of MRF stiffness forces impeding unintended joystick motions, embodiments of the MRF joystick system minimize operator fatigue and enhance operator experience by reducing the degree to which unintended joystick motions may arise requiring physically countering or correcting by an operator. Additionally, reductions in unintended joystick motions likewise reduce unintended movements (or other joystick-controlled actions) of a work vehicle to minimize component wear, boost efficiency, and otherwise promote precise, consistent control of work vehicle movement and functions in response to operator commands. The highly responsive nature of the MRF joystick resistance mechanism enables the joystick stiffness to be rapidly increased in response to detection of a disturbance force, such as disturbance resulting from impacting of an implement against a surface, prior to or substantially concomitantly with travel of such vibrations to the operator and MRF joystick device(s). Further, embodiments of the MRF joystick resistance mechanism can generate MRF stiffness forces over a continuous range, thereby allowing the MRF joystick device to progressively increase the joystick stiffness (in a stepped or continuous manner) in certain instances; e.g., to gradually drive sensed OIO motions to null or in response to increasing vibrational intensity within a high vibratory environment. Various other benefits are obtained by embodiments of the work vehicle MRF joystick systems, as described above.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle magnetorheological fluid (MRF) joystick system for usage onboard a work vehicle, the work vehicle MRF joystick system comprising:
   a joystick device having a detent position and a detent hold force, the joystick device comprising:
      a base housing;
      a joystick movably mounted to the base housing; and
      a joystick position sensor configured to monitor movement of the joystick relative to the base housing;
   an MRF joystick resistance mechanism controllable to vary a first joystick stiffness resisting movement of the joystick relative to the base housing in at least one degree of freedom; and
   a controller architecture coupled to the joystick position sensor and to the MRF joystick resistance mechanism, the controller architecture configured to:
      detect when unintended joystick motion conditions occur during operation of the work vehicle; and
      when detecting unintended joystick motion conditions, command the MRF joystick resistance mechanism to increase the first joystick stiffness in a manner reducing susceptibility of the joystick device to unintended joystick motions and command the MRF joystick resistance mechanism to increase the hold force of the detent position.

2. The work vehicle MRF joystick system of claim 1, wherein the controller architecture is configured to detect when unintended joystick motion conditions occur during work vehicle operation by determining whether joystick motions, when sensed by the joystick position sensor, are intentionally caused by an operator of the work vehicle.

3. The work vehicle MRF joystick system of claim 2, wherein the controller architecture is further configured to:
   identify when joystick motions sensed by the joystick position sensor comprise operator-induced oscillations of the joystick; and
   determine that the joystick motions are unintentionally caused by the work vehicle operator when the joystick motions comprise operator-induced oscillations of the joystick.

4. The work vehicle MRF joystick system of claim 3, wherein the controller architecture is further configured to:
   when identifying the joystick motions comprise operator-induced oscillations of the joystick, estimate a magnitude of the operator-induced oscillations; and
   progressively increase the first joystick stiffness until the magnitude of the operator-induced oscillations of the joystick decreases below a predetermined acceptance threshold.

5. The work vehicle MRF joystick system of claim 1, further comprising a vehicle motion data source coupled to the controller architecture; and
   wherein the controller architecture is configured to detect when unintended joystick motion conditions occur by detecting abrupt changes in a speed, heading, or orientation of the work vehicle utilizing data from the vehicle motion data source.

6. The work vehicle MRF joystick system of claim 1, wherein the controller architecture is configured to detect when unintended joystick motion conditions occur based, at least in part, on usage of a particular implement type by the work vehicle.

7. The work vehicle MRF joystick system of claim 1, wherein the joystick device is rotatable relative to the base housing about a first axis and about a second axis perpendicular to the first axis; and
   wherein the first joystick stiffness comprises a force resisting rotation of the joystick device about at least the first axis.

8. The work vehicle MRF joystick system of claim 7, wherein the MRF joystick resistance mechanism is further controllable to vary a second joystick stiffness resisting rotation of the joystick about the second axis; and
   wherein the controller architecture is configured to selectively command the MRF joystick resistance mechanism to vary the first joystick stiffness independently of the second joystick stiffness.

9. The work vehicle MRF joystick system of claim 1, further comprising an operator interface coupled to the controller architecture; and
   wherein the controller architecture is configured to detect when unintended joystick motion conditions occur based, at least in part, on operator input entered via the operator interface indicating that elevated disturbance forces are likely to occur during impending operation of the work vehicle.

10. A work vehicle magnetorheological fluid (MRF) joystick system for usage onboard a work vehicle, the work vehicle MRF joystick system comprising:
   a joystick device, comprising:
      a base housing;
      a joystick movably mounted to the base housing; and
      a joystick position sensor configured to monitor movement of the joystick relative to the base housing;
   an MRF joystick resistance mechanism controllable to vary a first joystick stiffness resisting movement of the joystick relative to the base housing in at least one degree of freedom;

a disturbance force sensor affixed to the work vehicle at a location remote from the joystick device and coupled to the controller architecture; and
a controller architecture coupled to the joystick position sensor and to the MRF joystick resistance mechanism, the controller architecture configured to:
detect when unintended joystick motion conditions occur during operation of the work vehicle; and
when detecting unintended joystick motion conditions, command the MRF joystick resistance mechanism to increase the first joystick stiffness in a manner reducing susceptibility of the joystick device to unintended joystick motions;
wherein the controller architecture is configured to detect when unintended joystick motion conditions occur during operation of the work vehicle when the disturbance force sensor detects a disturbance force having a magnitude exceeding a predetermined threshold.

11. The work vehicle MRF joystick system of claim 10, wherein the controller architecture is further configured to command the MRF joystick resistance mechanism to increase the first joystick stiffness by an amount substantially proportional to the magnitude of the disturbance force detected by the disturbance force sensor.

12. A work vehicle magnetorheological fluid (MRF) joystick system for usage onboard a work vehicle, the work vehicle MRF joystick system comprising:
a joystick device, comprising:
a base housing;
a joystick movably mounted to the base housing; and
a joystick position sensor configured to monitor movement of the joystick relative to the base housing;
an MRF joystick resistance mechanism controllable to vary a first joystick stiffness resisting movement of the joystick relative to the base housing in at least one degree of freedom;
a disturbance force sensor affixed to the work vehicle and coupled to the controller architecture; and
a controller architecture coupled to the joystick position sensor and to the MRF joystick resistance mechanism, the controller architecture configured to:
detect when unintended joystick motion conditions occur during operation of the work vehicle, when detecting unintended joystick motion conditions, command the MRF joystick resistance mechanism to increase the first joystick stiffness in a manner reducing susceptibility of the joystick device to unintended joystick motions; and
monitor for impact forces detected by the disturbance force sensor and having magnitudes exceeding a predetermined threshold, and when the disturbance force sensor detects an impact force having a magnitude exceeding the predetermined magnitude threshold, command the MRF joystick resistance mechanism to increase the first joystick stiffness prior to or substantially concurrently with propagation of the impact force to the joystick device.

13. The work vehicle MRF joystick system of claim 12, wherein the disturbance force sensor is integrated into a boom assembly attached to a chassis of the work vehicle; and
wherein the controller architecture is configured to monitor for impact forces detected by the disturbance force sensor during usage of the boom assembly.

14. A work vehicle magnetorheological fluid (MRF) joystick system for usage onboard a work vehicle, the work vehicle MRF joystick system comprising:
a joystick device, comprising:
a base housing;
a joystick movably mounted to the base housing; and
a joystick position sensor configured to monitor movement of the joystick relative to the base housing;
an MRF joystick resistance mechanism controllable to vary a joystick stiffness resisting movement of the joystick relative to the base housing in at least one degree of freedom; and
a controller architecture coupled to the joystick position sensor and to the MRF joystick resistance mechanism, the controller architecture configured to:
determine when unintended joystick motions of the joystick are presently occurring based, at least in part, on data provided by the joystick position sensor; and
when determining that unintended joystick motions are presently occurring, command the MRF joystick resistance mechanism to increase the joystick stiffness in a manner reducing the unintended joystick motions; and
wherein determining that unintended joystick motions of the joystick are presently occurring is based, at least in part, on assessing whether the joystick is unintentionally displaced from a detent position of the joystick device during operation of the work vehicle.

15. The work vehicle MRF joystick system of claim 14, wherein the controller architecture is configured to:
identify when joystick motions sensed by the joystick position sensor comprise operator-induced oscillations of the joystick; and
determine that the joystick motions are unintentionally caused by a work vehicle operator when the joystick motions comprise operator-induced oscillations of the joystick.

16. The work vehicle MRF joystick system of claim 15, wherein the controller architecture is further configured to:
when identifying the joystick motions comprise operator-induced oscillations of the joystick, estimate a magnitude of the operator-induced oscillations; and
progressively increase the joystick stiffness until the magnitude of the operator-induced oscillations of the joystick decreases below a predetermined acceptance threshold.

17. A work vehicle magnetorheological fluid (MRF) joystick system for usage onboard a work vehicle, the work vehicle MRF joystick system comprising:
a joystick device, comprising:
a base housing;
a joystick movably mounted to the base housing; and
a joystick position sensor configured to monitor movement of the joystick relative to the base housing;
an MRF joystick resistance mechanism controllable to vary a joystick stiffness resisting movement of the joystick relative to the base housing in at least one degree of freedom;
disturbance force sensors configured to detect disturbance forces imparted to the work vehicle; and
a controller architecture coupled to the joystick position sensor, to the MRF joystick resistance mechanism, and to the disturbance force sensors, the controller architecture is configured to:
monitor for the disturbance forces detected by the disturbance force sensors during operation of the work vehicle; and when the disturbance force sensors detect a disturbance force surpassing a predetermined threshold, command the MRF joystick resistance mechanism to increase the joystick stiffness to reduce a likelihood of unintended joystick motions resulting from the detected disturbance force.

18. The work vehicle MRF joystick system of claim 17, wherein the controller architecture is configured to:
monitor for impact forces detected by the disturbance force sensors and having magnitudes exceeding the predetermined threshold; and
when the disturbance force sensors detect an impact force having a magnitude exceeding the predetermined threshold, command the MRF joystick resistance mechanism to increase the joystick stiffness prior to or substantially concurrently with propagation of the detected impact force to the joystick device.

\* \* \* \* \*